US012375963B2

(12) United States Patent
Ashour et al.

(10) Patent No.: US 12,375,963 B2
(45) Date of Patent: Jul. 29, 2025

(54) PERCEPTION-AIDED BEAM-BASED COMMUNICATIONS

(71) Applicant: QUALCOMM Incorporated, San Diego, CA (US)

(72) Inventors: Mahmoud Ashour, San Diego, CA (US); Kapil Gulati, Belle Mead, NJ (US); Preeti Kumari, San Diego, CA (US); Himaja Kesavareddigari, Bridgewater, NJ (US); Kyle Chi Guan, New York, NY (US); Anantharaman Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 419 days.

(21) Appl. No.: 17/874,202

(22) Filed: Jul. 26, 2022

(65) Prior Publication Data

US 2024/0040415 A1     Feb. 1, 2024

(51) Int. Cl.
*H04W 24/10*     (2009.01)
*H04B 17/318*     (2015.01)
*H04L 5/00*     (2006.01)

(52) U.S. Cl.
CPC .......... *H04W 24/10* (2013.01); *H04B 17/318* (2015.01); *H04L 5/0048* (2013.01)

(58) Field of Classification Search
None
See application file for complete search history.

(56) References Cited

U.S. PATENT DOCUMENTS

| | | | |
|---|---|---|---|
| 2019/0150013 A1* | 5/2019 | Zhang | H04B 7/082 375/224 |
| 2019/0253117 A1* | 8/2019 | Raghavan | H04B 7/0834 |
| 2020/0228189 A1* | 7/2020 | Tang | H04W 36/06 |
| 2021/0351833 A1* | 11/2021 | Sakhnini | H04B 7/0641 |
| 2022/0039081 A1* | 2/2022 | Liu | H04W 4/027 |

(Continued)

OTHER PUBLICATIONS

3GPP: "3rd Generation Partnership Project, Technical Specification Group Radio Access Network, Study on New Radio Access Technology Physical Layer Aspects (Release 14)", 3GPP TR 38.802 V14.2.0, Sep. 2017, 3GPP Organizational Partners, Sophia Antipolis Valbonne, France, 145 Pages.

*Primary Examiner* — Duc T Duong
(74) *Attorney, Agent, or Firm* — Holland & Hart LLP

(57) ABSTRACT

Methods, systems, and devices for wireless communications are described. The described techniques provide for using situational information to aid in beam-based communications between a first user equipment (UE) and a network entity. The first UE may collect data at one or more sensors and may generate the situational information using the collected data. The first UE may then use the situational information in a beam selection procedure to identify suitable candidate beams for communicating with the network entity. The first UE may also transmit the situational information to the network entity in a beam management report, and the network entity may use the situational information to identify suitable candidate beams for communicating with the first UE. In some cases, the network entity may also use the situational information to identify suitable candidate beams for communicating with a second UE associated with the first UE.

28 Claims, 14 Drawing Sheets

(56) References Cited

U.S. PATENT DOCUMENTS

| | | | |
|---|---|---|---|
| 2022/0295257 A1* | 9/2022 | Arshad | H04W 8/08 |
| 2022/0377756 A1* | 11/2022 | Sun | H04B 7/0695 |
| 2023/0057057 A1* | 2/2023 | Shrestha | H04W 36/0085 |
| 2023/0254708 A1* | 8/2023 | Suh | H04W 16/28 370/329 |
| 2023/0284043 A1* | 9/2023 | Sun | H04W 24/08 370/252 |
| 2023/0353326 A1* | 11/2023 | Jayasinghe Laddu | H04L 5/006 |
| 2024/0388351 A1* | 11/2024 | Säily | H04B 7/06952 |

* cited by examiner

PERCEPTION-AIDED BEAM-BASED COMMUNICATIONS

FIELD OF TECHNOLOGY

The following relates to wireless communications, including perception-aided beam-based communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities, each supporting wireless communication for communication devices, which may be known as user equipment (UE). Some wireless communications systems may support beam-based communications between a UE and a network entity. Beam-based communications may refer to communications using one or more beams or beam weights (e.g., beamforming). In such systems, a UE and a network entity may support techniques for beam management to identify suitable beams for communicating with each other. Improved techniques for beam management may be desirable.

SUMMARY

The described techniques relate to improved methods, systems, devices, and apparatuses that support perception-aided beam-based communications. For example, the described techniques provide for using situational information (e.g., perception information) to aid in beam-based communications between a first user equipment (UE) and a network entity. The first UE may collect data at one or more sensors and may generate the situational information using the collected data. The first UE may then use the situational information in a beam selection procedure to identify suitable candidate beams for communicating with the network entity. The first UE may also transmit the situational information to the network entity in a beam management report, and the network entity may use the situational information to identify suitable candidate beams for communicating with the first UE. In some cases, the network entity may also use the situational information to identify suitable candidate beams for communicating with a second UE associated with the first UE.

A method for wireless communication at a user equipment is described. The method may include receiving, from a network entity, an indication of a configuration for a beam management report indicating that the UE is to transmit situational information to the network entity in the beam management report, collecting data at one or more sensors at the UE based on the configuration for the beam management report, and transmitting the beam management report including the situational information to the network entity, where the situational information is based on the collected data.

An apparatus for wireless communication at a user equipment is described. The apparatus may include a processor, memory coupled with the processor, and instructions stored in the memory. The instructions may be executable by the processor to cause the apparatus to receive, from a network entity, an indication of a configuration for a beam management report indicating that the UE is to transmit situational information to the network entity in the beam management report, collect data at one or more sensors at the UE based on the configuration for the beam management report, and transmit the beam management report including the situational information to the network entity, where the situational information is based on the collected data.

Another apparatus for wireless communication at a user equipment is described. The apparatus may include means for receiving, from a network entity, an indication of a configuration for a beam management report indicating that the UE is to transmit situational information to the network entity in the beam management report, means for collecting data at one or more sensors at the UE based on the configuration for the beam management report, and means for transmitting the beam management report including the situational information to the network entity, where the situational information is based on the collected data.

A non-transitory computer-readable medium storing code for wireless communication at a user equipment is described. The code may include instructions executable by a processor to receive, from a network entity, an indication of a configuration for a beam management report indicating that the UE is to transmit situational information to the network entity in the beam management report, collect data at one or more sensors at the UE based on the configuration for the beam management report, and transmit the beam management report including the situational information to the network entity, where the situational information is based on the collected data.

Some examples of the method, apparatuses, and non-transitory computer-readable medium described herein may further include operations, features, means, or instructions for transmitting, to the network entity, a capability indication indicating that the UE may be capable of collecting the data at the one or more sensors and generating the situational information, where receiving the indication of the configuration for the beam management report may be based on transmitting the capability indication.

Some examples of the method, apparatuses, and non-transitory computer-readable medium described herein may further include operations, features, means, or instructions for selecting one or more beams for receiving one or more reference signals from the network entity based on the situational information, the one or more reference signals being for beam management and receiving the one or more reference signals from the network entity using the one or more beams.

In some examples of the method, apparatuses, and non-transitory computer-readable medium described herein, the one or more reference signals include synchronization signal blocks or channel state information reference signals.

Some examples of the method, apparatuses, and non-transitory computer-readable medium described herein may further include operations, features, means, or instructions for performing one or more measurements on a first subset of one or more reference signals received from the network entity based on the situational information and skipping performing one or more measurements on a second subset of the one or more reference signals received from the network entity based on the situational information.

Some examples of the method, apparatuses, and non-transitory computer-readable medium described herein may further include operations, features, means, or instructions for transmitting the one or more measurements performed on the first subset of the one or more reference signals in the beam management report to the network entity.

In some examples of the method, apparatuses, and non-transitory computer-readable medium described herein, the one or more measurements include reference signal received power measurements.

Some examples of the method, apparatuses, and non-transitory computer-readable medium described herein may further include operations, features, means, or instructions for identifying a signal reflector based on one or more of the data collected at the one or more sensors at the UE, measurements performed on one or more reference signals received from the network entity, or a beam codebook at the UE, where the situational information indicates a location of the signal reflector.

Some examples of the method, apparatuses, and non-transitory computer-readable medium described herein may further include operations, features, means, or instructions for receiving, from the network entity, one or more reference signals reflected by the signal reflector to the UE based on transmitting the situational information indicating the location of the signal reflector to the network entity, performing one or more measurements on the one or more reference signals, and transmitting the one or more measurements to the network entity in a subsequent beam management report.

In some examples of the method, apparatuses, and non-transitory computer-readable medium described herein, the situational information includes a location of the UE, dimensions of an object detected by the UE, a Doppler spread at the UE, confidence bounds associated with the data collected at the one or more sensors at the UE, or a combination thereof.

A method for wireless communication at a network entity is described. The method may include receiving, from a first UE, a capability indication indicating that the first UE is capable of collecting data at one or more sensors and generating situational information, transmitting, to the first UE based on receiving the capability indication, an indication of a configuration for a beam management report indicating that the first UE is to transmit the situational information to the network entity in the beam management report, and receiving, from the first UE, the beam management report including the situational information, where the situational information is based on the collected data at the first UE.

An apparatus for wireless communication at a network entity is described. The apparatus may include a processor, memory coupled with the processor, and instructions stored in the memory. The instructions may be executable by the processor to cause the apparatus to receive, from a first UE, a capability indication indicating that the first UE is capable of collecting data at one or more sensors and generating situational information, transmit, to the first UE based on receiving the capability indication, an indication of a configuration for a beam management report indicating that the first UE is to transmit the situational information to the network entity in the beam management report, and receive, from the first UE, the beam management report including the situational information, where the situational information is based on the collected data at the first UE.

Another apparatus for wireless communication at a network entity is described. The apparatus may include means for receiving, from a first UE, a capability indication indicating that the first UE is capable of collecting data at one or more sensors and generating situational information, means for transmitting, to the first UE based on receiving the capability indication, an indication of a configuration for a beam management report indicating that the first UE is to transmit the situational information to the network entity in the beam management report, and means for receiving, from the first UE, the beam management report including the situational information, where the situational information is based on the collected data at the first UE.

A non-transitory computer-readable medium storing code for wireless communication at a network entity is described. The code may include instructions executable by a processor to receive, from a first UE, a capability indication indicating that the first UE is capable of collecting data at one or more sensors and generating situational information, transmit, to the first UE based on receiving the capability indication, an indication of a configuration for a beam management report indicating that the first UE is to transmit the situational information to the network entity in the beam management report, and receive, from the first UE, the beam management report including the situational information, where the situational information is based on the collected data at the first UE.

Some examples of the method, apparatuses, and non-transitory computer-readable medium described herein may further include operations, features, means, or instructions for selecting one or more first beams for transmitting one or more first reference signals to the first UE based on the situational information, the one or more first reference signals being for beam management, transmitting a request for the first UE to monitor and report measurements performed on the one or more first reference signals, transmitting an indication of the one or more first beams to the first UE, and transmitting the one or more first reference signals to the first UE using the one or more first beams.

Some examples of the method, apparatuses, and non-transitory computer-readable medium described herein may further include operations, features, means, or instructions for receiving, from the first UE, one or more measurements performed by the first UE on the one or more first reference signals and selecting a beam for communicating with the first UE based on the one or more measurements received from the first UE.

In some examples of the method, apparatuses, and non-transitory computer-readable medium described herein, the one or more measurements include reference signal received power measurements.

Some examples of the method, apparatuses, and non-transitory computer-readable medium described herein may further include operations, features, means, or instructions for selecting one or more second beams for transmitting one or more second reference signals to a second UE based on the situational information received from the first UE, the second UE associated with the first UE, transmitting a request for the second UE to monitor and report measurements performed on the one or more second reference signals, transmitting an indication of the one or more second beams to the second UE, and transmitting the one or more second reference signals to the second UE using the one or more second beams.

In some examples of the method, apparatuses, and non-transitory computer-readable medium described herein, the one or more first reference signals include channel state information reference signals.

Some examples of the method, apparatuses, and non-transitory computer-readable medium described herein may further include operations, features, means, or instructions for identifying a signal reflector based on the situational information received from the first UE in the beam management report, where the situational information indicates a location of the signal reflector.

Some examples of the method, apparatuses, and non-transitory computer-readable medium described herein may further include operations, features, means, or instructions for selecting one or more first beams for transmitting one or more first reference signals to the first UE based on identifying the signal reflector, the one or more first reference signals being for beam management, transmitting a request for the first UE to monitor and report measurements performed on the one or more first reference signals, transmitting an indication of the one or more first beams to the first UE, transmitting the one or more reference signals to the first UE using the one or more first beams, the one or more reference signals reflected by the signal reflector to the first UE, and receiving, from the UE in a subsequent beam management report, one or more measurements performed by the UE on the one or more reference signals.

In some examples of the method, apparatuses, and non-transitory computer-readable medium described herein, the situational information includes a location of the first UE, dimensions of an object detected by the first UE, a Doppler spread at the first UE, confidence bounds associated with the data collected at the one or more sensors at the first UE, or a combination thereof.

DETAILED DESCRIPTION

Figure 1:
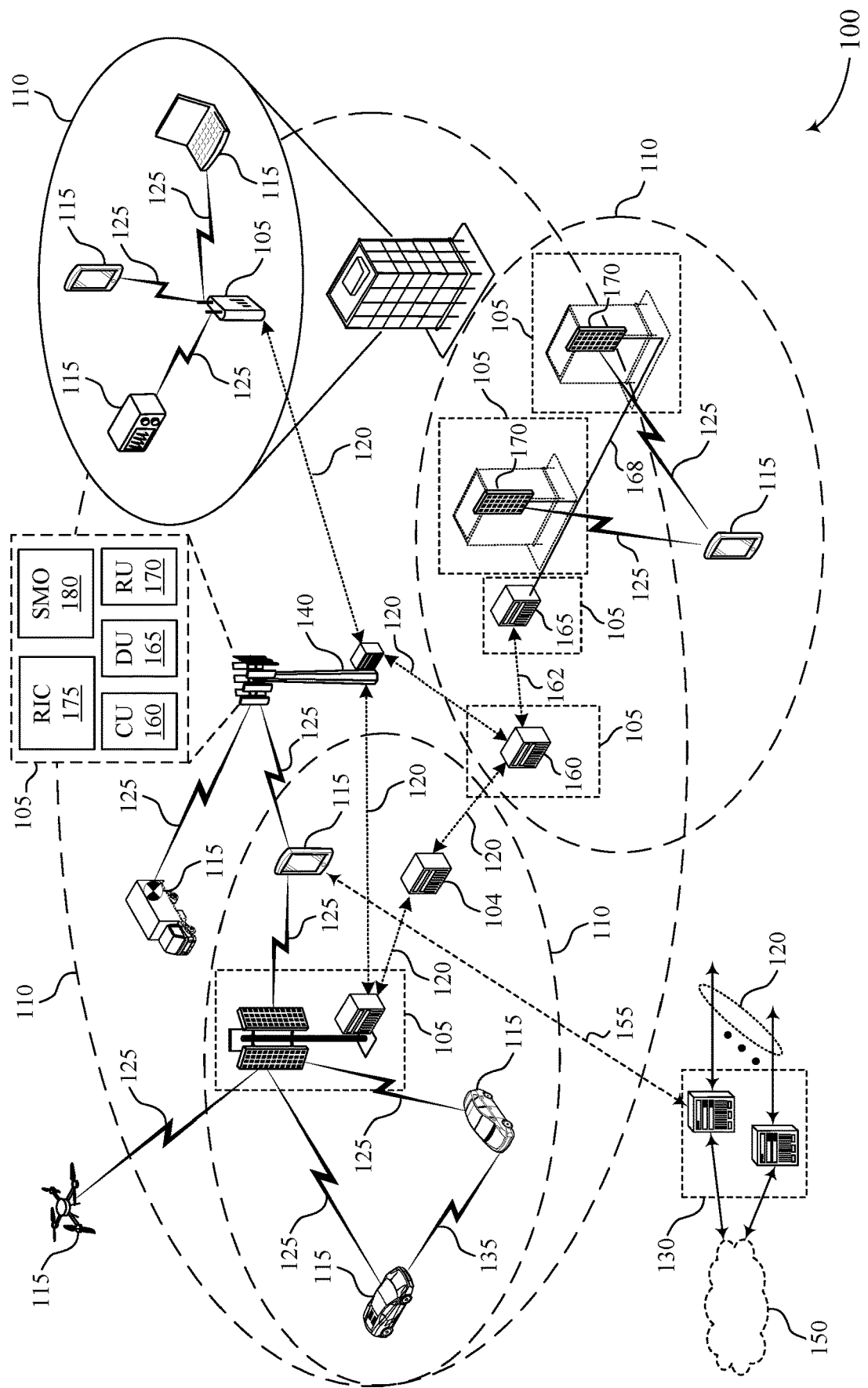
FIG. 1 illustrates an example of a wireless communications system that supports perception-aided beam-based communications in accordance with one or more aspects of the present disclosure.

In some wireless communications systems, millimeter wave (mmW) may be one of multiple technologies supported to increase the data rate of the communications. To overcome poor propagation characteristics associated with mmW communications, it may be appropriate for a user equipment (UE) or a network entity to use a number of antennas to form narrow beams for communications. Further, it may be appropriate for the UE and the network entity to attain beam alignment for mmW communications (e.g., support techniques for beam management, beam selection, or the like). The mmW channel properties may be relatively more deterministic given a certain environment geometry (e.g., compared to lower frequency channels), and a UE or a network entity may identify suitable beams to communicate with each other based on the mmW channel properties.

In some implementations, a UE and a network entity may perform an exhaustive search-based beam sweeping procedure (e.g., sweeping through every available beam or a wide range of beams) to identify one or more suitable beams for communicating with each other. However, the exhaustive search-based beam sweeping procedure may cause relatively increased overhead (e.g., take a relatively long amount of time) for both initial beam establishment (e.g., identifying an initial beam for mmW communications) and beam tracking procedures (e.g., updating a beam for mmW communications). In some cases (e.g., with the emergence of wireless technologies in the automotive industry and vehicle-to-everything (V2X) technologies), some UEs (e.g., autonomous vehicles, which may also be referred to as self-driving vehicles, driverless cars, ego vehicles, ego cars, or other similar terminology) may be equipped with sensors like satellite navigation, radars, light detection and ranging radars (LiDARs), cameras, or the like. Further, there may be techniques for supporting beam tracking for mmW systems using deep learning or machine learning approaches (e.g., with relatively good evaluation results).

Utilizing these sensors and techniques for supporting beam tracking, a UE, a network entity, or both in a wireless communications system may support efficient techniques for identifying configurations for communicating with each other. For instance, a wireless communications system may support efficient techniques for using situational information to aid in beam-based communications between a first UE and a network entity. The first UE may collect data at one or more sensors and may generate the situational information using the collected data. The first UE may then use the situational information in a beam selection procedure to identify suitable candidate beams for communicating with the network entity. The first UE may also transmit the situational information to the network entity in a beam management report, and the network entity may use the situational information to identify suitable candidate beams for communicating with the first UE. The network entity may also use the situational information to identify suitable candidate beams for communicating with a second UE associated with the first UE.

Aspects of the disclosure are initially described in the context of wireless communications systems. Aspects of the disclosure are further illustrated by and described with reference to apparatus diagrams, system diagrams, and flowcharts that relate to perception-aided beam-based communications.

FIG. 1 illustrates an example of a wireless communications system 100 that supports perception-aided beam-based communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being anode. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support perception-aided beam-based communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

As mentioned, the wireless communications system 100 may be an example of an NR system and may support 5G communications. In 5G communications and other communications, mmW may be one of multiple technologies supported to increase the data rate of the communications. To overcome poor propagation characteristics associated with mmW communications, a UE 115 or a network entity 105 may use a number of antennas to form narrow beams for communications. Further, the UE 115 and the network entity 105 may employ techniques to attain beam alignment for mmW communications (e.g., support techniques for beam management, beam selection, or the like). The mmW channel properties may be relatively more deterministic given a certain environment geometry (e.g., compared to lower frequency channels), and a UE 115 or a network entity 105 may identify suitable beams to communicate with each other based on the mmW channel properties.

To achieve transmit and receive beam alignment in beam-based communications over an air interface, beam management procedures may be defined. The beam management procedures may rely on beam measurements at a UE 115 and reports from the UE 115. A network entity 105 may configure reference signals for a UE 115 to monitor (e.g., synchronization signal blocks (SSBs) and channel state information reference signals (CSI-RSs)). The network entity 105 may also configure the UE 115 (e.g., using a measurement configuration) to perform measurements on the reference signals, and the network entity 105 may configure the UE 115 (e.g., using a report configuration that includes resources, timing information, etc.) to report the measurements to the network entity 105. The network entity 105 may use different beams (e.g., transmit beams (TxBs)) to beamform transmissions of the configured reference signals, and the UE 115 may use different beams (e.g., receive beams (RxBs)) to measure the reference signals according to the measurement configuration. The UE 115 may report measurements to the network entity 105 according to the report configuration.

A network entity 105 may select a control or traffic beam (e.g., TxB) based, in part, on UE reports, and the network entity 105 may indicate the selected beam to a UE 115 through a transmission configuration indication (TCI) framework. The TCI framework may refer to established signaling between the network entity 105 and the UE 115 used to indicate beams used by the network entity 105 to transmit reference signals, control information, or data to the UE 115. The UE 115 may select a beam (e.g., RxB) for communicating with the network entity 105 based, in part, on the indicated beam to be used by the network entity 105 and previous reference signal measurements. Beam management procedures at a network entity 105 and a UE 115 may allow the network entity 105 and the UE 115 to identify suitable beams for communicating with each other. In some cases, however, beam management procedures may be deficient. For instance, if a UE 115 is constantly moving or changing positions in a network, the UE 115 and a network entity 105 may repeatedly perform beam selection to identify suitable beams for communicating with each other. As a result, the overhead of beam management in the network may be high, and power consumption and processing at the UE 115 may also be high.

The wireless communications system 100 may support efficient techniques for beam management to reduce overhead, processing complexity, and power consumption at a UE 115. Beam management procedures may be modified based on situational information obtained via sensors on a UE 115 (e.g., cameras). For instance, selection of reference signal configurations at a network entity 105, measurements of reference signals performed at a UE 115, and reporting of measurements from a UE 115 may be modified.

A UE 115 (e.g., a sensing UE) may process sensing information to perceive a surrounding environment (e.g., perform object detection). The UE 115 may then select one or more beams (e.g., RxBs) to measure configured reference signals based on the sensing information. The sensing may allow the UE 115 to refine beams in promising directions leading to potential throughput enhancement. The sensing may also prevent the UE 115 from wasting power on measuring beam directions that are unlikely to result in high reference signal received power (RSRP) measurements; thus, reducing UE power consumption. The UE 115 may also report measurements and partial perception information (e.g., situational information) to a network entity 105. The network entity 105 may utilize the reported measurements and partial UE perception information to configure reference signals beamformed in promising beam directions. The network entity 105 may also configure reference signals for measurements by one or more other UEs 115 associated with the sensing UE 115 based on the perception information. In some examples, UE association criterion may depend on spatial proximity.

Figure 2:
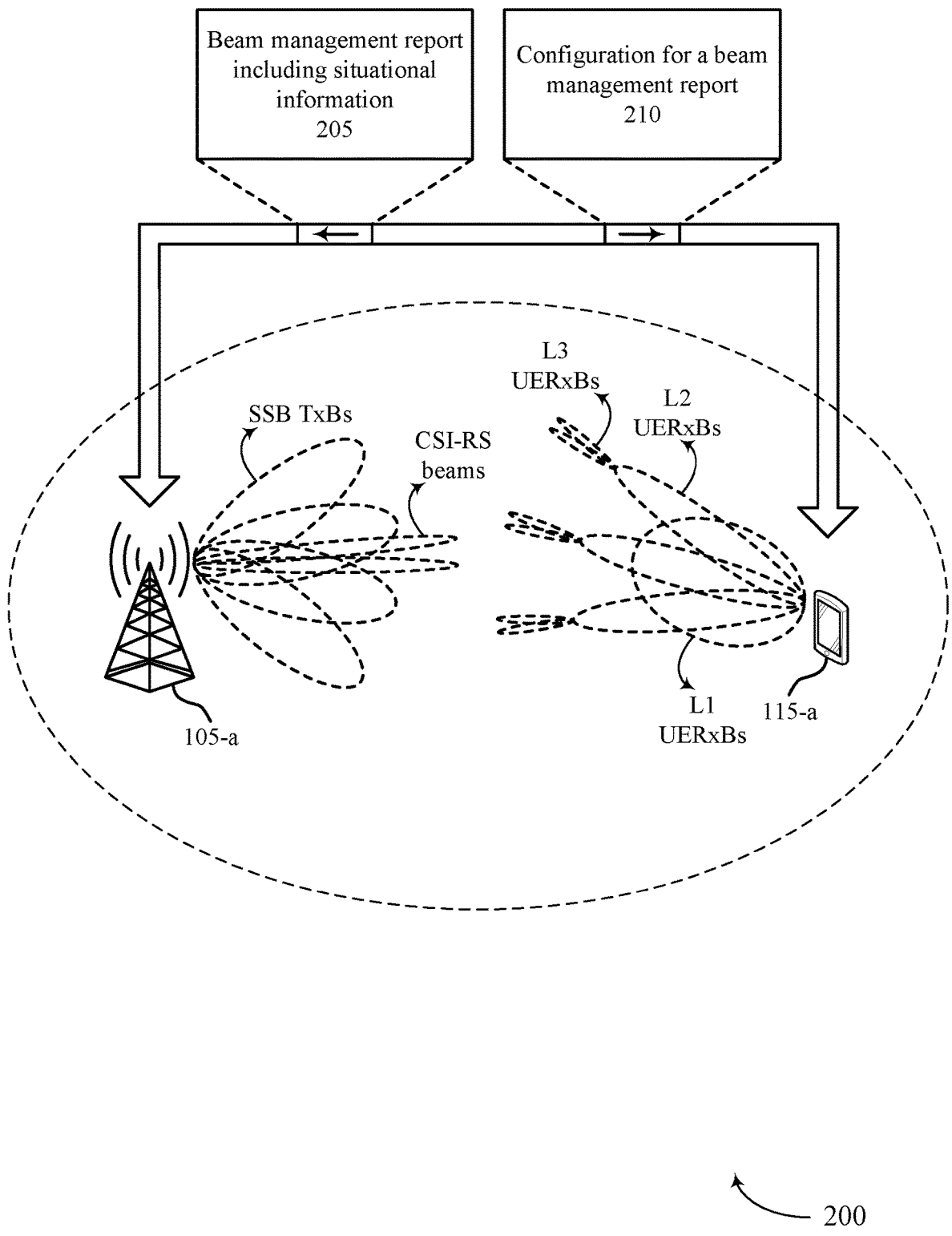
FIG. 2 illustrates an example of a wireless communications system that supports perception-aided beam-based communications in accordance with one or more aspects of the present disclosure.

FIG. 2 illustrates an example of a wireless communications system 200 that supports perception-aided beam-based communications in accordance with one or more aspects of the present disclosure. The wireless communications system 200 includes a UE 115-a, which may be an example of a UE 115 described with reference to FIG. 1. The wireless communications system 200 also includes a network entity 105-a, which may be an example of a network entity 105 described with reference to FIG. 1. The wireless communications system 200 may implement aspects of the wireless communications system 100. For instance, the wireless communications system 200 may support efficient techniques for beam management to minimize overhead and minimize power consumption and processing at the UE 115-a and the network entity 105-a.

A network entity 105-a and a UE 115-a may support beam management or beam selection to select suitable beams for communicating with each other. Examples of beams available for communications between the network entity 105-a and the UE 115-a are depicted in FIG. 2. The network entity 105-a may beamform SSB transmissions using wide beams with limited array gain, and the UE 115-a may receive the SSB transmissions. The network entity 105-a may also beamform CSI-RS transmissions using narrow beams with high array gain, and the UE 115-a may receive the CSI-RS transmissions. The UE 115-a may have one or more levels of beams (e.g., UE receive beams (UERxBs)), and as beam level increases, beam width may decrease and corresponding array gain may increase. For example, UE 115-a may implement two, three, or more than three, levels of beams, which may be referred to as L1 beams, L2 beams, L3 beams, etc. The network entity 105-a may determine reference signal configurations and measurement and report configurations for beam management, and the network entity 105-a may perform beam selection (e.g., TxB selection) based on UE reports. The UE 115-a may determine beams (e.g., UERxBs) to use to measure configured reference signals (e.g., may iteratively evaluate UERxBs), and the UE 115-a may determine a serving beam (e.g., RxB) for communicating with the network entity 105-a based on an indicated beam (e.g., TxB) to be used by the network entity 105-a.

In wireless communications system 200, the UE 115-a may be equipped with sensors (e.g., cameras). The UE 115-a may perceive a surrounding environment through processing sensing information collected at the sensors. For instance, the UE 115-a may perform object detection using captured camera frames, and the UE 115-a may identify potential nearby signal reflectors. The UE 115-a may then use situational information in beam management procedures to enhance throughput and reduce power consumption at the UE 115-a. The enhanced throughput and power savings may be achieved by using situational information to control the reference signals configured for the UE 115-a to measure. For instance, the network entity 105-a may configure aperiodic CSI-RSs beamformed in spatial directions determined based on the situational information. Further, the enhanced throughput and power savings may be achieved by using situational information to aid the UE 115 in selecting beams (e.g., RxBs) used to measure configured reference signals (e.g., a UE 115 may skip measuring reference signals that are unlikely to result in high RSRP values).

The UE 115-a may perform initial acquisition and a random-access channel (RACH) procedure to connect with the network entity 105-a. The initial acquisition may include beam sweeping at the UE 115-a and the network entity 105-a, where the UE 115-a may receive reference signals on multiple beams, and the network entity 105-a may transmit the reference signals on multiple beams. The UE 115-a may identify a beam (e.g., TxB) for the network entity 105-a to use for communicating with the UE 115-a, and the UE 115-a may implicitly report the beam to the network entity 105-*a* through the RACH occasion the UE 115-*a* uses to transmit a first message of a RACH procedure (e.g., msgA or msg1). The network entity 105-*a* may then use the indicated beam to transmit messages to and receive messages from the UE 115-*a* in the RACH procedure (e.g., the network entity 105-*a* may stick to the indicated TxB through the rest of a RACH procedure, including msgB or msgs 2-4).

The UE 115-*a* may indicate a sensing or perception capability to the network entity 105-*a* (e.g., before receiving an RRC configuration message from the network entity 105-*a*). The network entity 105-*a* may then send an RRC configuration message to the UE 115-*a* indicating active SSBs. The network entity 105-*a* may also configure the UE 115-*a* to report measurements on configured reference signals (e.g., RSRP measurements on active SSBs) and report situational information. For instance, the network entity 105-*a* may transmit an indication of a configuration for a beam management report 210 to the UE 115-*a* indicating that the UE 115-*a* is to report situational information to the network entity 105-*a*. The situational information may include detected reflectors or other objects (e.g., a location and dimension of a detected reflector or another object), a Doppler spread (e.g., if the UE 115-*a* is mobile), and confidence bounds on the situational information.

The UE 115-*a* may measure configured SSBs using one or more beams (e.g., L1 RxBs) and may report measurements (e.g., RSRP) to the network entity 105-*a* in a beam management report 205. That is, the UE 115-*a* may report measurements (e.g., RSRP measurements) of configured SSBs to the network entity 105-*a*. If the UE 115-*a* identifies one or more potential signal reflectors (e.g., through perception), the UE 115-*a* may refine its beams (e.g., RxBs) and use beams (e.g., L2 RxBs) in spatial directions covering the identified one or more potential reflectors (e.g., to receive reference signals from the network entity 105-*a*). The UE 115-*a* may also use perception or the situational information to skip monitoring SSBs that may be unlikely to result in high RSRP values; thus, saving energy. The UE 115-*a* may report the situational information to the network entity 105-*a* in the beam management report 205 (e.g., situational information pertaining to potential reflectors, including a location of a reflector, a dimension of a reflector, a Doppler spread, or confidence bounds).

The network entity 105-*a* may receive the situational information in the beam management report 205 from the UE 115-*a*, and the network entity may use the reported situational information to configure aperiodic or semi-persistent CSI-RSs for beamforming to the UE 115-*a* based on the situational information. For instance, the network entity 105-*a* may configure CSI-RSs for beamforming towards directions of reported potential reflectors. In some cases, the network entity 105-*a* may also associate one or more UEs 115 with the UE 115-*a* (e.g., a sensing UE 115) based on, for example, spatial proximity. In such cases, the network entity 105-*a* may configure similar CSI-RSs to the one or more UEs 115 (e.g., the set of associated UEs 115), and the UE 115-*a* may indirectly influence beam management for the one or more UEs 115. The UE 115-*a* may perform measurements on configured CSI-RSs received from the network entity 105-*a* and may report the measurements (e.g., RSRP values) to the network entity 105-*a*. The network entity 105-*a* may use the reported measurements to determine a beam refinement (e.g., TxB refinement). For instance, the network entity 105-*a* may switch beams if an RSRP of a wide beam is greater than an RSRP of a narrow beam plus some threshold (e.g., for a preconfigured threshold).

Figure 3:
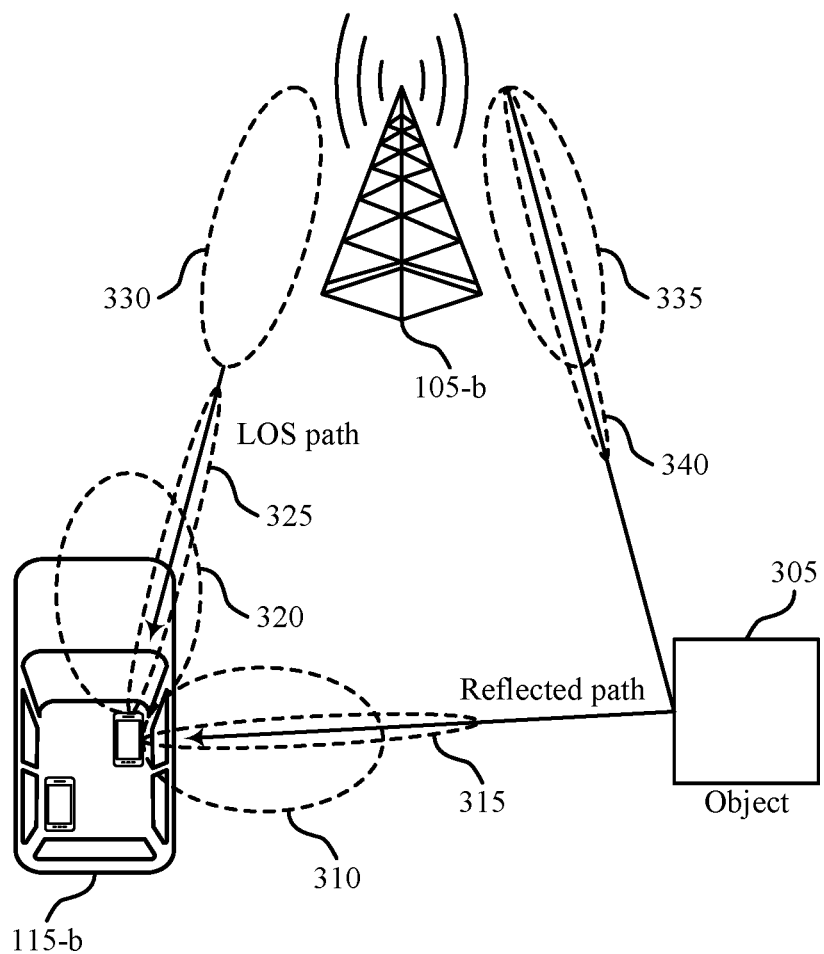
FIG. 3 illustrates an example of beam selection using situational information in accordance with one or more aspects of the present disclosure.

FIG. 3 illustrates an example of beam selection using situational information in accordance with one or more aspects of the present disclosure. A UE 115-*b* may have a sensing and perception capability, and the UE 115-*b* may indicate the sensing and perception capability to the network entity 105-*b*. The UE 115-*b* may perform object detection and may identify potential signal reflectors. The UE 115-*b* may use information on the detected objects to refine beams (e.g., RxBs) used to measure one or more configured SSBs. The UE 115-*b* may also use the information on the detected objects to skip measuring one or more configured SSBs that may be highly unlikely to yield a strong signal.

The network entity 105-*b* may configure the UE 115-*b* to report situational information (e.g., locations of detected reflectors), and the UE 115-*b* may report the situational information to the network entity 105-*b* in addition to RSRP measurements. The network entity 105-*b* may use the reported situational information to configure CSI-RSs for the UE 115-*b* to measure, and the network entity 105-*b* may beamform the CSI-RSs towards potential reflectors (e.g., enabling TxB refinement in the directions of potential reflectors). The network entity 105-*b* may also configure one or more UEs 115 associated with the UE 115-*b* (e.g., a sensing UE 115) with CSI-RSs based on the situational information received from the UE 115-*b*. In some examples, an associated UE 115 may be a UE 115 inside a same vehicle as the UE 115-*b*.

In the example of FIG. 3, the network entity 105-*b* may transmit a first SSB using a first transmit beam 330 (e.g., SSB TxB) and the network entity 105-*b* may transmit a second SSB using a second transmit beam 335 (e.g., SSB TxB). The UE 115-*b* may receive the first SSB using a first receive beam 320 (e.g., L1 UERxB), and the UE 115-*b* may receive the second SSB using a second receive beam 310 (e.g., L1 UERxB, L2 UERxB). The UE 115-*b* may perform sensing and may detect the object 305 and determine that the UE 115-*b* received reference signals using the second receive beam 310 on a reflected path from the object 305. As such, the UE 115-*b* may transmit situational information including an indication of the object 305 (e.g., a location and dimensions of the object 305) to the network entity 105-*b* in a beam management report. The network entity 105-*b* may identify the object and may identify a beam 340 (e.g., CSI-RS TxB) for transmitting CSI-RSs to be reflected off the object 305 to the UE 115-*b*. The network entity 105-*b* may also identify another beam quasi co-located with the beam 330 for transmitting CSI-RSs to the UE 115-*b* on a line-of-sight (LOS) path. The network entity 105-*b* may then transmit the CSI-RSs to the UE 115-*b*. The UE 115-*b* may receive CSI-RSs from the network entity 105-*b* on an LOS path using a third receive beam 325 (e.g., L2 UERxB, L3 UERxB), and the UE 115-*b* may receive CSI-RSs from the network entity 105-*b* on a reflected path using a fourth receive beam 315 (e.g., L2 UERxB, L3 UERxB).

The UE 115-*b* may perform measurements on the CSI-RSs received from the network entity 105-*b*, and the UE 115-*b* may determine to communicate with the network entity 105-*b* using a beam pair including the beam 340 and the beam 315. The UE 115-*b* may transmit an indication of the beam 340 to the network entity 105-*b* for the network entity 105-*b* to use to communicate with the UE 115-*b*. The UE 115-*b* may then communicate with the network entity 105-*b* using the beam 315, and the network entity 105-*b* may communicate with the UE 115-*b* using the beam 340.

Because the UE 115-*b* and the network entity 105-*b* may use situational information to aid in beam management, the UE 115-*b* and the network entity 105-*b* may identify the beam pair including the beam 315 and the beam 340 for communications, resulting in enhanced throughput. Further, the UE 115-*b* may save power and processing since the UE 115-*b* may avoid performing measurements on reference signals from the network entity 105-*b* that may be unlikely to result in high RSRP values.

Figure 4:
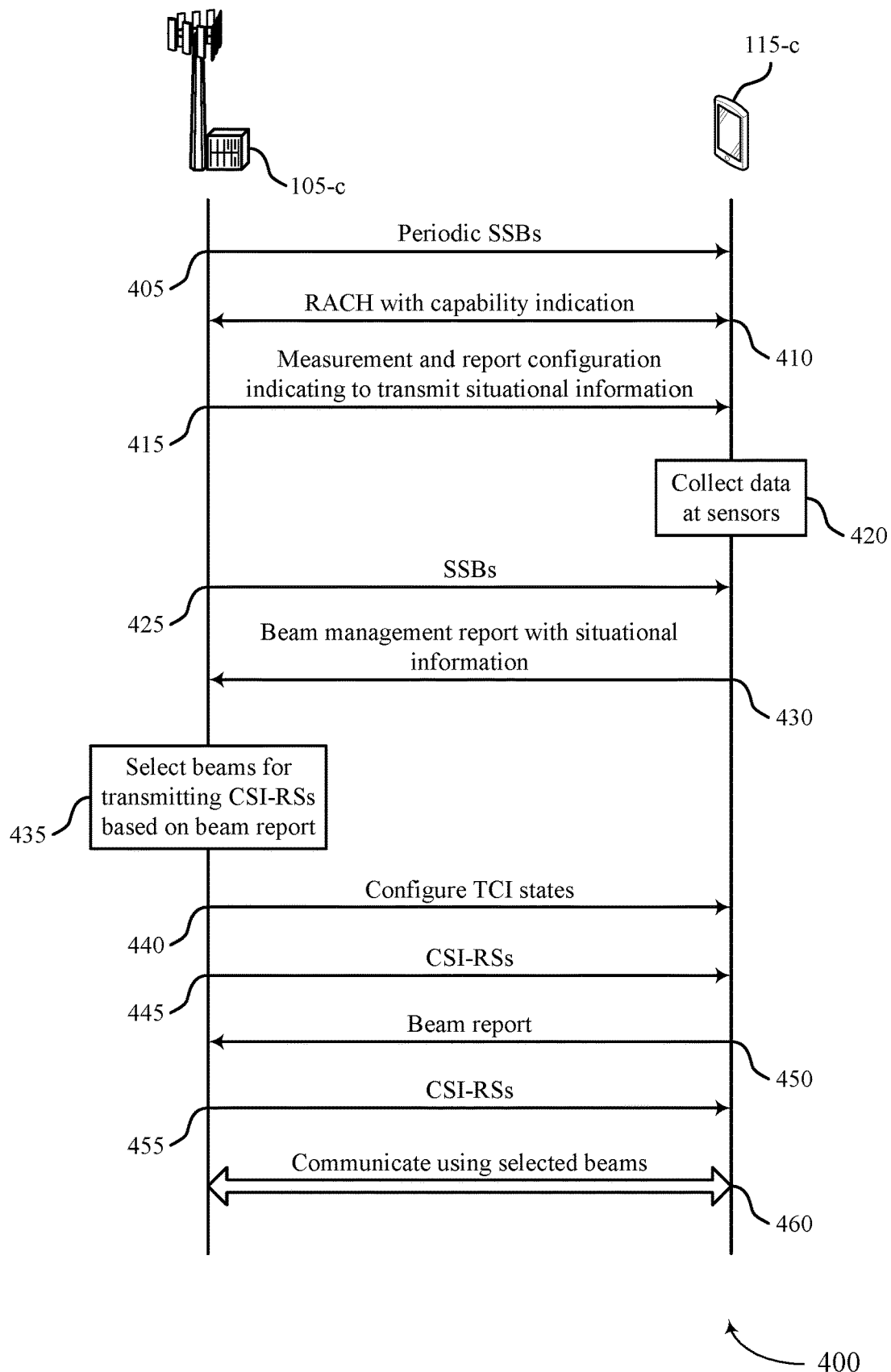
FIG. 4 illustrates an example of a process flow that supports perception-aided beam-based communications in accordance with one or more aspects of the present disclosure.

FIG. 4 illustrates an example of a process flow 400 that supports perception-aided beam-based communications in accordance with one or more aspects of the present disclosure. The process flow 400 includes a network entity 105-*c*, which may be an example of a network entity 105 described with reference to FIGS. 1-3. The process flow 400 also includes a UE 115-*c*, which may be an example of a UE 115 described with reference to FIGS. 1-3. The process flow 400 may implement aspects of the wireless communications system 100 or the wireless communications system 200. For instance, the process flow 400 may support efficient techniques for beam management to minimize overhead and minimize power consumption and processing at the UE 115-*c* and the network entity 105-*c*.

In the following description of the process flow 400, the signaling exchanged between the UE 115-*c* and the network entity 105-*c* may be exchanged in a different order than the example order shown, or the operations performed by the UE 115-*c* and the network entity 105-*c* may be performed in different orders or at different times. Some operations may also be omitted from the process flow 400, and other operations may be added to the process flow 400.

The process flow 400 may modify downlink beam management procedures jointly at the UE 115-*c* and the network entity 105-*c* based on perception to enhance throughput and reduce power consumption. The described techniques may be applied in scenarios where one or more UEs 115 are equipped with sensors. The described techniques may also enable a UE 115 to perceive its surrounding environment and use the situational information (e.g., for beam management). The situational information may include data collected at one or more sensors at a UE 115 (e.g., sensing data) or any information derived from the data (e.g., an identifier of a signal reflector, a position of the UE 115, a velocity of the UE 115, an acceleration of the UE 115, etc.).

A high value described herein may correspond to a value satisfying a threshold, and a low value described herein may also correspond to a value satisfying a threshold. Satisfying a threshold may, depending on the context, refer to a value being greater than the threshold, greater than or equal to the threshold, less than the threshold, less than or equal to the threshold, equal to the threshold, not equal to the threshold, or the like.

At 405, the network entity 105-*c* may transmit periodic SSBs, and the UE 115-*c* may receive one or more of the SSBs. The UE 115-*c* may receive the SSBs and may sweep receive beams across each SSB (e.g., receive each SSB with multiple receive beams). The UE 115-*c* may then identify an SSB (e.g., $SSB_i$) and a receive beam (e.g., $UERxB_j$) pair associated with the best or highest measurements (e.g., highest values of RSRP, reference signal received quality (RSRQ), or signal-to-interference-plus-noise ratio (SINR)). The UE 115-*c* may then use the receive beam (e.g., $RxB_j$) in a RACH procedure with the network entity 105-*c* (e.g., for transmitting and receiving RACH messages). The UE 115-*c* may also signal (e.g., implicitly) the SSB (e.g., $SSB_i$) associated with the best or highest measurements to the network entity 105-*c*, and the network entity 105-*c* may identify a beam to use in the RACH procedure with the UE 115-*c* based on the SSB (e.g., a beam quasi co-located with the SSB ($QCL(SSB_i)$)).

At 410, the UE 115-*c* and the network entity 105-*c* may perform the RACH procedure using the beams identified based on the periodic SSBs. The RACH procedure may be a two-step RACH procedure where two messages are exchanged between the UE 115-*c* and the network entity 105-*c* (e.g., msgA and msgB), or the RACH procedure may be a four-step RACH procedure where four messages are exchanged between the UE 115-*c* and the network entity 105-*c* (e.g., msgs 1-4). The UE 115-*c* may transmit a capability indication to the network entity 105-*c* indicating that the UE 115-*c* is capable of collecting data at one or more sensors and generating situational information based on the collected data. The UE 115-*c* may transmit the capability indication as part of the RACH procedure or separately from (e.g., after) the RACH procedure. After the RACH procedure, the network entity 105-*c* and the UE 115-*c* may have established a serving beam pair (e.g., TRPTxB and UERxB), but the network entity 105-*c* and the UE 115-*c* may support beam management and beam selection techniques for updating or refining the beam pair.

At 415, the network entity 105-*c* may transmit, and the UE 115-*c* may receive, an indication of a measurement configuration and a report configuration (e.g., P1 or connected mode measurement or report configuration). The indication of the report configuration may also be referred to as an indication of a configuration for a beam management report, and the indication of the configuration for the beam management report may indicate that the UE 115-*c* is to transmit situational information to the network entity 105-*c* in a beam management report (e.g., based on or in response to the capability indication). At 420, the UE 115-*c* may collect data at one or more sensors at the UE 115-*c* based on the configuration for the beam management report. At 425, the UE 115-*c* may receive SSBs from the network entity 105-*c*. The SSBs may be the same as the periodic SSBs at 405 or may be different from the periodic SSBs. In some examples, the SSBs may correspond to active SSBs, and the network entity 105-*c* may indicate the active SSBs to the UE 115-*c* (e.g., in an RRC configuration message or system information).

The UE 115-*c* may generate situational information from the data collected at 420, and the UE 115-*c* may perform measurements on the SSBs received at 425. At 430, the UE 115-*c* may transmit a beam management report including the measurements performed on the SSBs and including the situational information. The situational information may include a location of the UE 115-*c*, a location of an object detected by the UE 115-*c*, dimensions of an object detected by the UE 115-*c*, a Doppler spread at the UE 115-*c*, or confidence bounds associated with the data collected at the one or more sensors or the situational information. In some examples, the UE 115-*c* may select one or more beams for receiving the SSBs based on the situational information, and the UE 115-*c* may perform the measurements on the SSBs received using the one or more beams. In some examples, the UE 115-*c* may select the one or more beams if the situational information indicates that SSBs received on the one or more beams may be more likely to have a high signal strength or signal quality.

In some examples, the UE 115-*c* may perform measurements on a first subset of the SSBs based on the situational information, and the UE 115-*c* may skip performing measurements on a second subset of the SSBs based on the situational information. For instance, the UE 115-*c* may identify SSBs expected to have a low signal strength or quality based on the situational information, and the UE 115-*c* may avoid performing measurements on these SSBs. In some cases, the UE 115-*c* may identify a signal reflector based on the data collected at the one or more sensors at the UE (e.g., based on the situational information), measurements performed on the SSBs, or a beam codebook at the UE 115-*c*. The UE 115-*c* may then transmit an indication of a location of the signal reflector to the network entity 105-*c* in the beam management report (e.g., in the situational information).

The network entity 105-*c* may receive the beam management report from the UE 115-*c*, and, at 435, the network entity 105-*c* may select one or more first beams for transmitting CSI-RSs to the UE 115-*c* based on the situational information in the beam management report. In one example, the network entity 105-*c* may select the one or more first beams based on the situational information indicating that CSI-RSs transmitted on the one or more beams may be more likely to have a high signal strength or signal quality. In another example, the network entity 105-*c* may identify a signal reflector based on the situational information received in the beam management report, and the network entity 105-*c* may select one or more first beams for transmitting CSI-RSs based on identifying the signal reflector. The one or more first beams may include at least one beam directed towards the signal reflector, where CSI-RSs transmitted on the at least one beam may be reflected by the signal reflector towards the UE 115-*c*. At 440, the network entity 105-*c* may configure TCI states (e.g., using a connected mode TCI configuration) indicating the one or more first beams that the network entity 105-*c* may use to transmit CSI-RSs to the UE 115-*c*. The network entity 105-*c* may also transmit a request for the UE 115-*c* to monitor and report measurements performed on the CSI-RSs.

At 445, the UE 115-*c* may receive CSI-RSs from the network entity 105-*c* (e.g., for P2 refinement). The network entity 105-*c* may transmit the CSI-RSs in a beam sweep (e.g., CSI-RS P2 Tx_1, . . . , Tx_N) using the one or more first beams selected at 435. The CSI-RSs may be quasi co-located with the SSB indicated by the UE 115-*c* to the network entity 105-*c* in the RACH procedure or in the beam management report at 430. In some examples, the UE 115-*c* may select one or more beams for receiving the CSI-RSs based on the situational information generated using the data collected at 420, and the UE 115-*c* may perform the measurements on the CSI-RSs received using the one or more beams. The UE 115-*c* may select the one or more beams based on the situational information indicating that CSI-RSs received on the one or more beams may be more likely to have a high signal strength or signal quality.

In some examples, the UE 115-*c* may perform measurements on a first subset of the CSI-RSs based on the situational information, and the UE 115-*c* may skip performing measurements on a second subset of the CSI-RSs based on the situational information. For instance, the UE 115-*c* may identify CSI-RSs expected to have a low signal strength or quality based on the situational information, and the UE 115-*c* may avoid performing measurements on these CSI-RSs. At 450, the UE 115-*c* may transmit a beam report to the network entity 105-*c* based on the measurements performed on the CSI-RSs. In some examples, the beam report may indicate a beam (e.g., Txi_k with a highest RSRP) for the network entity 105-*c* to use to communicate with the UE 115-*c* (e.g., the network entity 105-*c* may refine to Txi_k). In other examples, the beam report may indicate measurements performed by the UE 115-*c* on the CSI-RSs, and the network entity 105-*c* may select a beam (e.g., Txi_k with a highest RSRP) for communicating with the UE 115-*c* based on the measurements.

At 455, the UE 115-*c* may receive CSI-RSs from the network entity 105-*c* (e.g., P3 refinement). The network entity 105-*c* may transmit the CSI-RSs using the beam selected based on the beam report at 450. For instance, the network entity 105-*c* may transmit repetitions of the CSI-RSs on the same beam. The UE 115-*c* may perform a beam sweep to receive the CSI-RSs, and the UE 115-*c* may receive the CSI-RSs on different receive beams (e.g., CSI-RS P2 Tx_1, . . . , Tx_N). The UE 115-*c* may then perform measurements on the CSI-RSs and may select a beam for communicating with the network entity 105-*c* based on the measurements (e.g., the UE 115-*c* may refine to UERxB$_j$_1).

In some examples, the UE 115-*c* may select one or more beams for receiving the CSI-RSs based on the situational information generated using the data collected at 420, and the UE 115-*c* may perform the measurements on the CSI-RSs received using the one or more beams. The UE 115-*c* may select the one or more beams based on the situational information indicating that CSI-RSs received on the one or more beams may be more likely to have a high signal strength or signal quality. In some examples, the UE 115-*c* may perform measurements on a first subset of the CSI-RSs based on the situational information, and the UE 115-*c* may skip performing measurements on a second subset of the CSI-RSs based on the situational information. For instance, the UE 115-*c* may identify CSI-RSs expected to have a low signal strength or quality based on the situational information, and the UE 115-*c* may avoid performing measurements on these CSI-RSs.

At 460, the UE 115-*c* may communicate with the network entity 105-*c* using the beam identified based on the CSI-RSs received at 455. In some examples, the network entity 105-*c* may select one or more second beams for transmitting CSI-RSs to a second UE 115 based on the situational information in the beam management report (e.g., received from the UE 115-*c*). The second UE 115 may be associated with or linked to the UE 115-*c*. The network entity 105-*c* may also configure TCI states for the second UE 115 indicating the one or more second beams that the network entity 105-*c* may use to transmit CSI-RSs to the second UE 115, and the network entity 105-*c* may transmit a request for the UE 115-*c* to monitor and report measurements performed on the CSI-RSs. The network entity 105-*c* may transmit the CSI-RSs to the second UE 115 using the one or more second beams, and the second UE 115 may perform measurements on the CSI-RSs which may be used to identify a beam at the network entity 105-*c* for communicating with the second UE 115 and a beam at the second UE 115 for communicating with the network entity 105.

The described techniques may provide a framework for leveraging sensing or perception capabilities at the UE 115-*c* to assist beam management procedures. The framework may allow for throughput enhancement for one or more UEs 115 (e.g., including the UE 115-*c* and the second UE 115) and power savings at the one or more UEs 115. The enhanced throughput and power savings may be achieved by using situational information to control the reference signals configured for one or more UEs 115 to measure. For instance, the network entity 105-*c* may configure aperiodic CSI-RSs beamformed in spatial directions determined based on the situational information. Further, the enhanced throughput and power savings may be achieved by using situational information to aid a UE 115 in selecting beams (e.g., RxBs)

used to measure configured reference signals (e.g., a UE 115 may skip measuring reference signals that are unlikely to result in high RSRP values).

Figure 5:
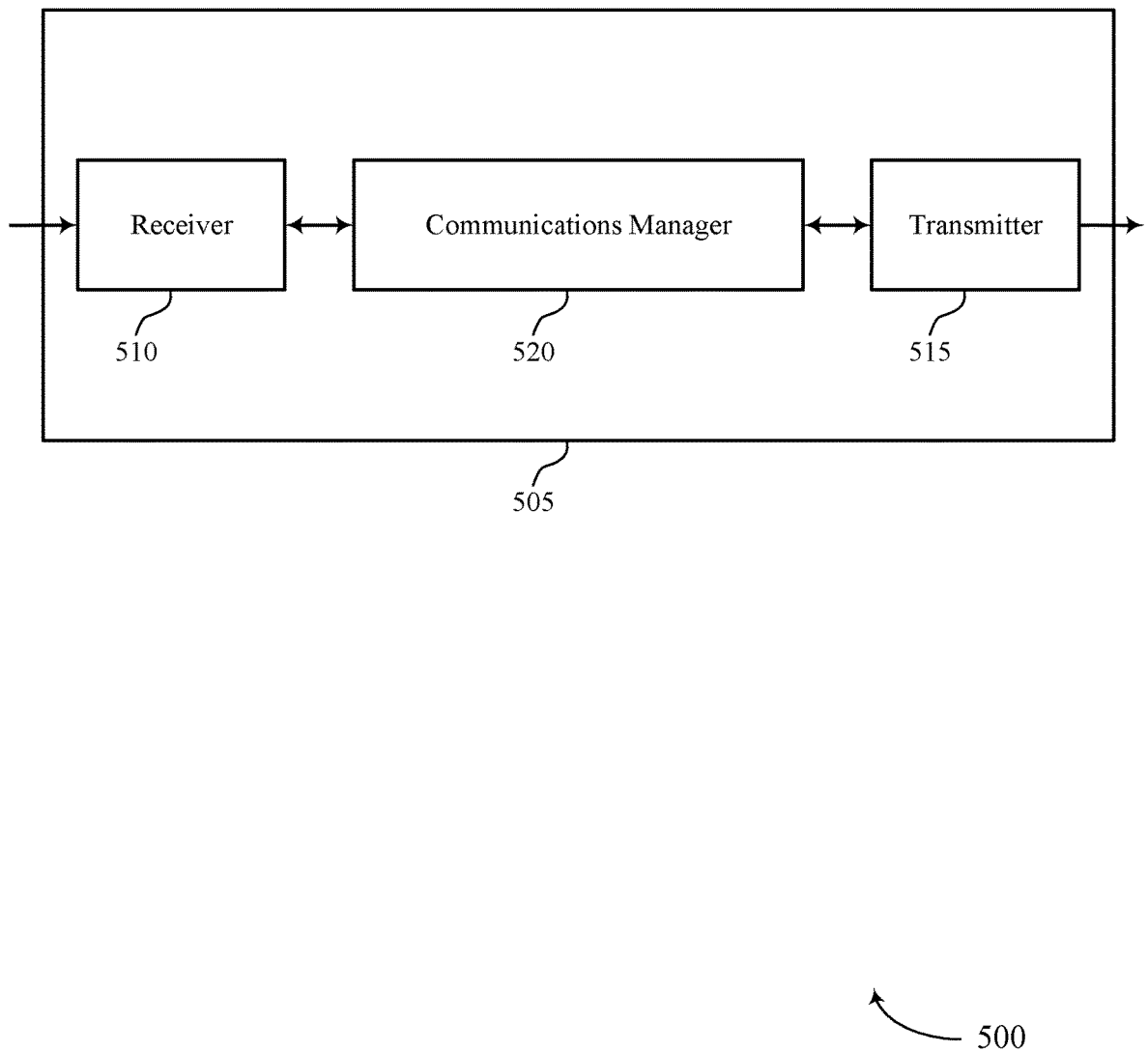
FIGS. 5 and 6 show block diagrams of devices that support perception-aided beam-based communications in accordance with one or more aspects of the present disclosure.

FIG. 5 shows a block diagram 500 of a device 505 that supports perception-aided beam-based communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to perception-aided beam-based communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to perception-aided beam-based communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of perception-aided beam-based communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a user equipment in accordance with examples as disclosed herein. For example, the communications manager 520 may be configured as or otherwise support a means for receiving, from a network entity, an indication of a configuration for a beam management report indicating that the UE is to transmit situational information to the network entity in the beam management report. The communications manager 520 may be configured as or otherwise support a means for collecting data at one or more sensors at the UE based on the configuration for the beam management report. The communications manager 520 may be configured as or otherwise support a means for transmitting the beam management report including the situational information to the network entity, where the situational information is based on the collected data.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, and more efficient utilization of communication resources. Because the device 505 may identify beams for communicating with a network entity 105 based on situational information, beam management at the device 505 may be improved. As a result, the device 505 may identify suitable beams for communicating with a network entity 105 (e.g., resulting in the more efficient utilization of communication resources) and the overhead for beam management may be reduced (e.g., resulting in the reduced power consumption and reduced processing).

Figure 6:
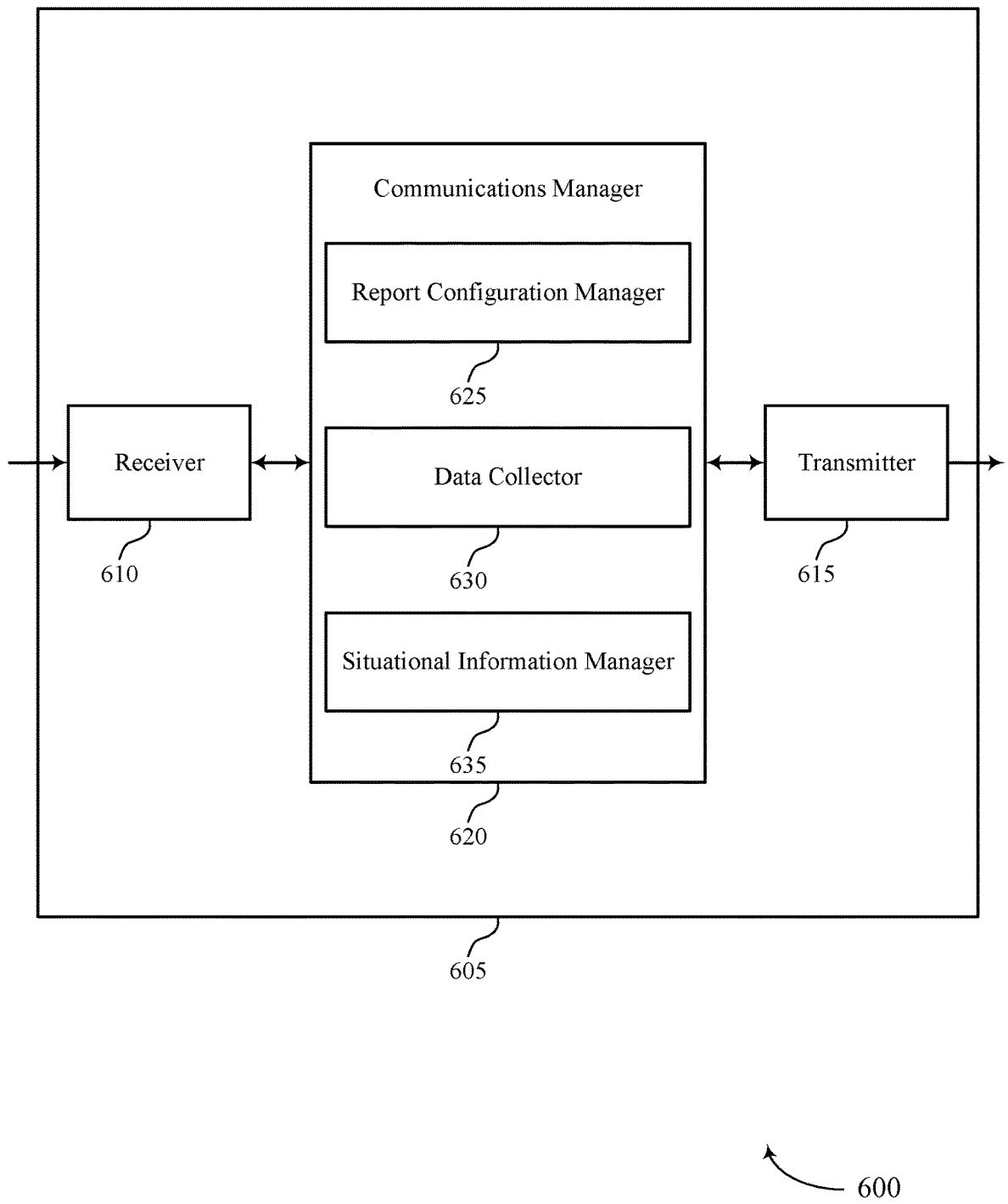

FIG. 6 shows a block diagram 600 of a device 605 that supports perception-aided beam-based communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to perception-aided beam-based communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to perception-aided beam-based communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of perception-aided beam-based communications as described herein. For example, the communications manager 620 may include a report configuration manager 625, a data collector 630, a situational information manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a user equipment in accordance with examples as disclosed herein. The report configuration manager 625 may be configured as or otherwise support a means for receiving, from a network entity, an indication of a configuration for a beam management report indicating that the UE is to transmit situational information to the network entity in the beam management report. The data collector 630 may be configured as or otherwise support a means for collecting data at one or more sensors at the UE based on the configuration for the beam management report. The situational information manager 635 may be configured as or otherwise support a means for transmitting the beam management report including the situational information to the network entity, where the situational information is based on the collected data.

Figure 7:
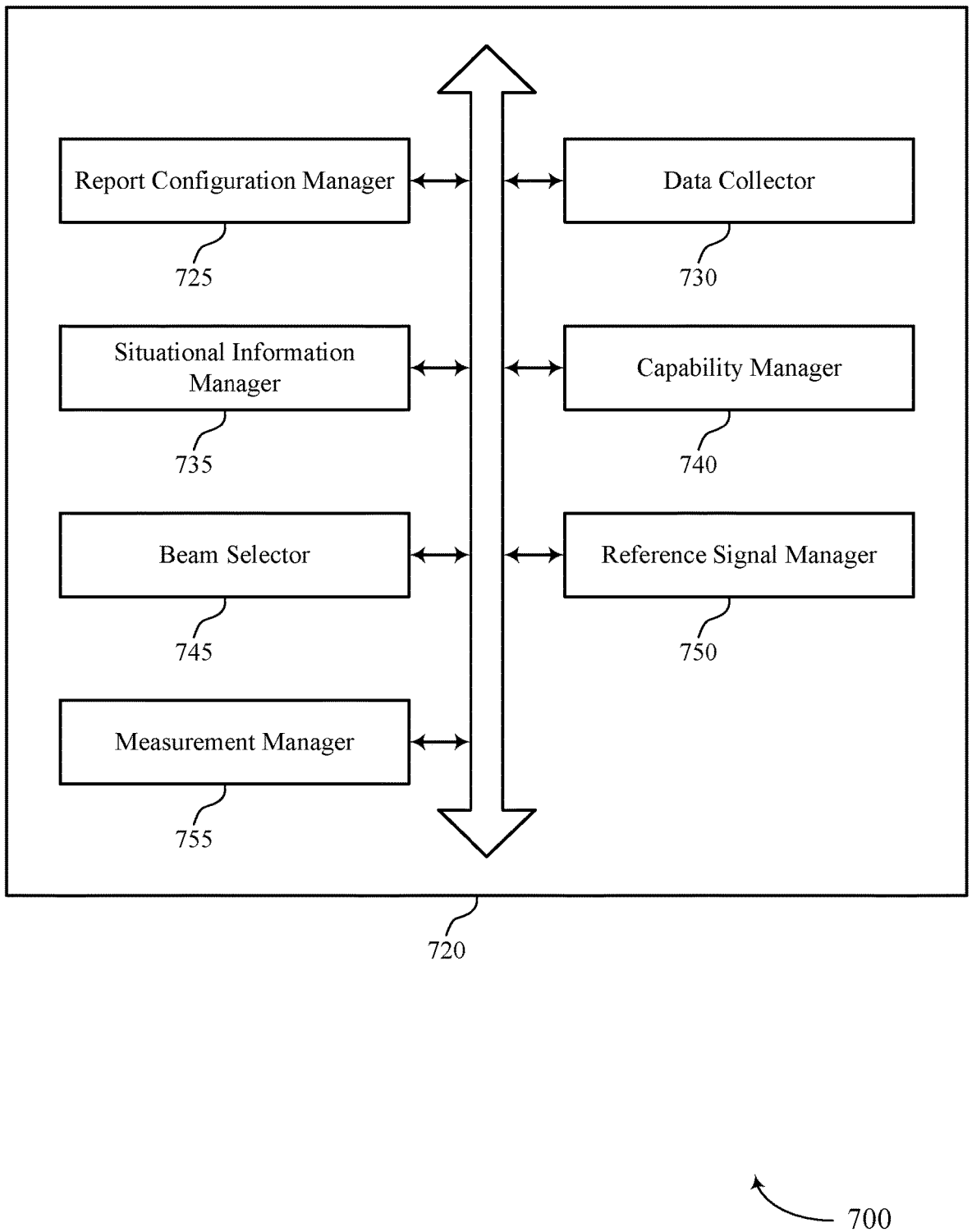
FIG. 7 shows a block diagram of a communications manager that supports perception-aided beam-based communications in accordance with one or more aspects of the present disclosure.

FIG. 7 shows a block diagram 700 of a communications manager 720 that supports perception-aided beam-based communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of perception-aided beam-based communications as described herein. For example, the communications manager 720 may include a report configuration manager 725, a data collector 730, a situational information manager 735, a capability manager 740, a beam selector 745, a reference signal manager 750, a measurement manager 755, or any combination thereof. Each of these components may communicate, directly or indirectly, with one another (e.g., via one or more buses).

The communications manager 720 may support wireless communication at a user equipment in accordance with examples as disclosed herein. The report configuration manager 725 may be configured as or otherwise support a means for receiving, from a network entity, an indication of a configuration for a beam management report indicating that the UE is to transmit situational information to the network entity in the beam management report. The data collector 730 may be configured as or otherwise support a means for collecting data at one or more sensors at the UE based on the configuration for the beam management report. The situational information manager 735 may be configured as or otherwise support a means for transmitting the beam management report including the situational information to the network entity, where the situational information is based on the collected data.

In some examples, the capability manager 740 may be configured as or otherwise support a means for transmitting, to the network entity, a capability indication indicating that the UE is capable of collecting the data at the one or more sensors and generating the situational information, where receiving the indication of the configuration for the beam management report is based on transmitting the capability indication.

In some examples, the beam selector 745 may be configured as or otherwise support a means for selecting one or more beams for receiving one or more reference signals from the network entity based on the situational information, the one or more reference signals being for beam management. In some examples, the reference signal manager 750 may be configured as or otherwise support a means for receiving the one or more reference signals from the network entity using the one or more beams.

In some examples, the one or more reference signals include synchronization signal blocks or channel state information reference signals.

In some examples, the measurement manager 755 may be configured as or otherwise support a means for performing one or more measurements on a first subset of one or more reference signals received from the network entity based on the situational information. In some examples, the measurement manager 755 may be configured as or otherwise support a means for skipping performing one or more measurements on a second subset of the one or more reference signals received from the network entity based on the situational information.

In some examples, the measurement manager 755 may be configured as or otherwise support a means for transmitting the one or more measurements performed on the first subset of the one or more reference signals in the beam management report to the network entity.

In some examples, the one or more measurements include reference signal received power measurements.

In some examples, the situational information manager 735 may be configured as or otherwise support a means for identifying a signal reflector based on one or more of the data collected at the one or more sensors at the UE, measurements performed on one or more reference signals received from the network entity, or a beam codebook at the UE, where the situational information indicates a location of the signal reflector.

In some examples, the reference signal manager 750 may be configured as or otherwise support a means for receiving, from the network entity, one or more reference signals reflected by the signal reflector to the UE based on transmitting the situational information indicating the location of the signal reflector to the network entity. In some examples, the measurement manager 755 may be configured as or otherwise support a means for performing one or more measurements on the one or more reference signals. In some examples, the measurement manager 755 may be configured as or otherwise support a means for transmitting the one or more measurements to the network entity in a subsequent beam management report.

In some examples, the situational information includes a location of the UE, dimensions of an object detected by the UE, a Doppler spread at the UE, confidence bounds associated with the data collected at the one or more sensors at the UE, or a combination thereof.

Figure 8:
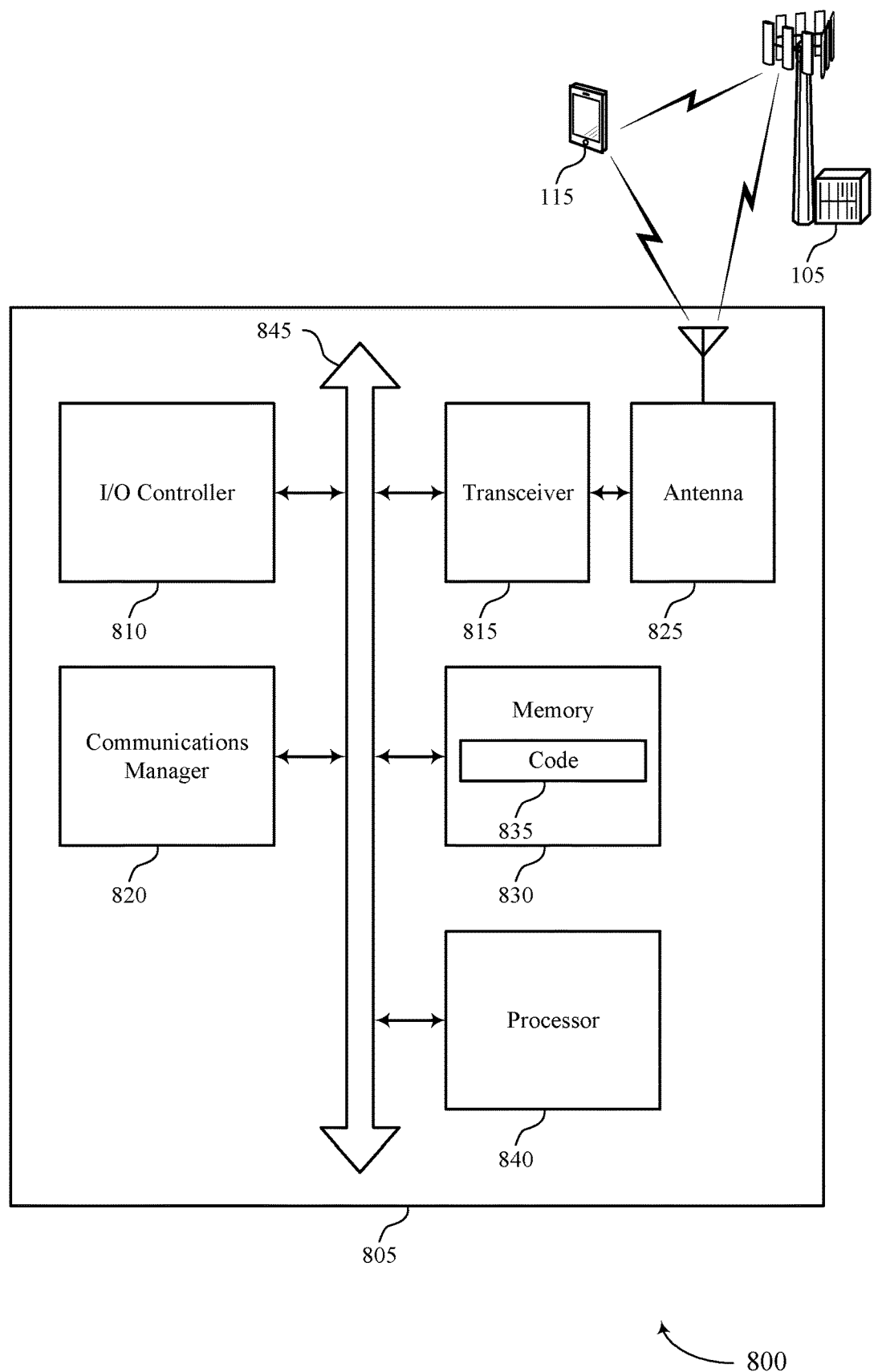
FIG. 8 shows a diagram of a system including a device that supports perception-aided beam-based communications in accordance with one or more aspects of the present disclosure.

FIG. 8 shows a diagram of a system 800 including a device 805 that supports perception-aided beam-based communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting perception-aided beam-based communications). For example, the device 805 or a component of the device 805 may include a processor 840 and memory 830 coupled with or to the processor 840, the processor 840 and memory 830 configured to perform various functions described herein.

The communications manager 820 may support wireless communication at a user equipment in accordance with examples as disclosed herein. For example, the communications manager 820 may be configured as or otherwise support a means for receiving, from a network entity, an indication of a configuration for a beam management report indicating that the UE is to transmit situational information to the network entity in the beam management report. The communications manager 820 may be configured as or otherwise support a means for collecting data at one or more sensors at the UE based on the configuration for the beam management report. The communications manager 820 may be configured as or otherwise support a means for transmitting the beam management report including the situational information to the network entity, where the situational information is based on the collected data.

By including or configuring the communications manager 820 in accordance with examples as described herein, the device 805 may support techniques for reduced processing, reduced power consumption, and more efficient utilization of communication resources. Because the device 805 may identify beams for communicating with a network entity 105 based on situational information, beam management at the device 805 may be improved. As a result, the device 805 may identify suitable beams for communicating with a network entity 105 (e.g., resulting in the more efficient utilization of communication resources) and the overhead for beam management may be reduced (e.g., resulting in the reduced power consumption and reduced processing).

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of perception-aided beam-based communications as described herein, or the processor 840 and the memory 830 may be otherwise configured to perform or support such operations.

Figure 9:
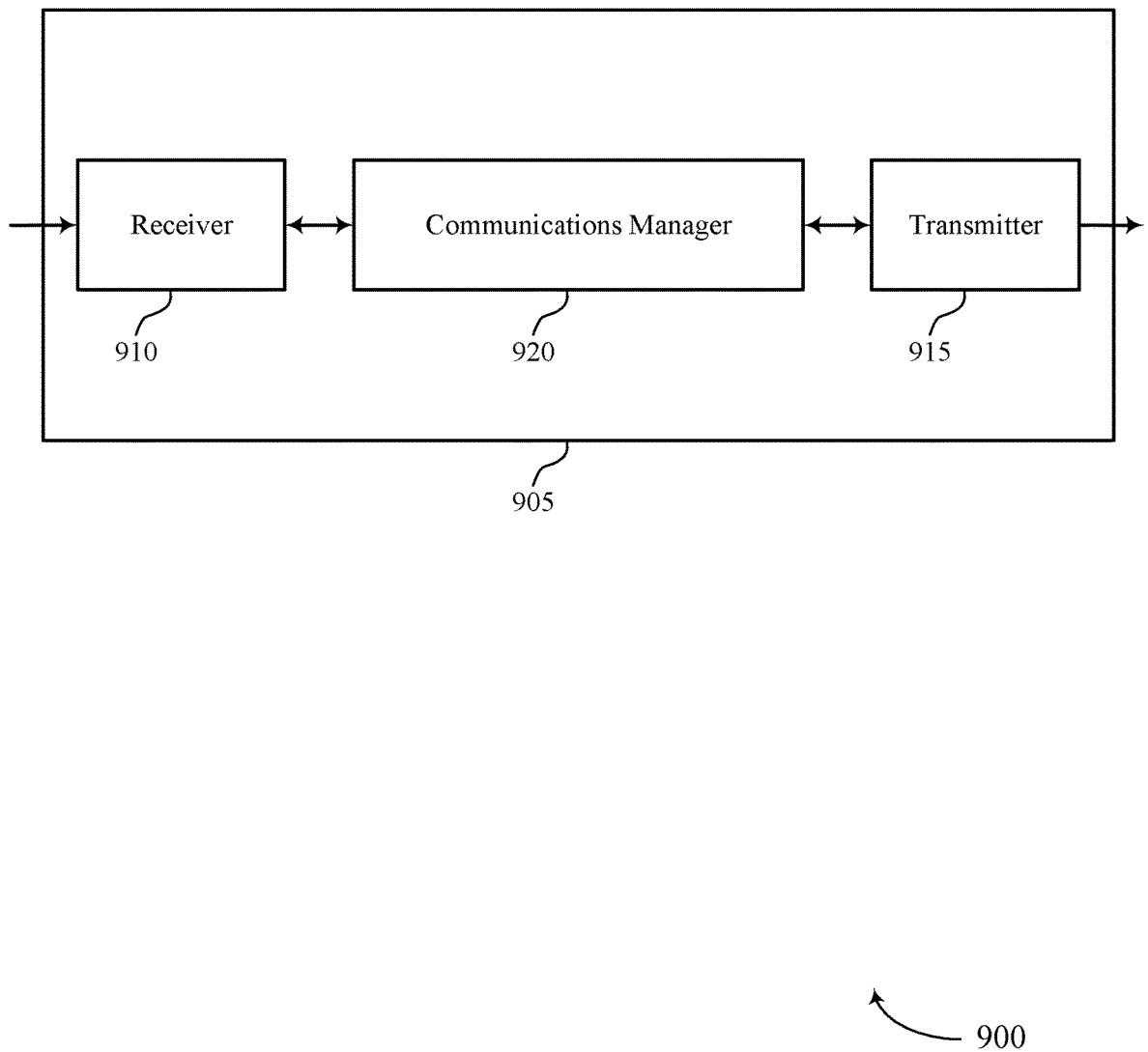
FIGS. 9 and 10 show block diagrams of devices that support perception-aided beam-based communications in accordance with one or more aspects of the present disclosure.

FIG. 9 shows a block diagram 900 of a device 905 that supports perception-aided beam-based communications in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of perception-aided beam-based communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for receiving, from a first UE, a capability indication indicating that the first UE is capable of collecting data at one or more sensors and generating situational information. The communications manager 920 may be configured as or otherwise support a means for transmitting, to the first UE based on receiving the capability indication, an indication of a configuration for a beam management report indicating that the first UE is to transmit the situational information to the network entity in the beam management report. The communications manager 920 may be configured as or otherwise support a means for receiving, from the first UE, the beam management report including the situational information, where the situational information is based on the collected data at the first UE.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources. Because the device 905 may receive, from a UE 115, situational information generated based on sensing data at the UE 115, the device 905 may use the situational information for beam management, and beam management at the device 905 may be improved. As a result, the device 905 may identify suitable beams for communicating with a UE 115 (e.g., resulting in the more efficient utilization of communication resources) and the overhead for beam management may be reduced (e.g., resulting in the reduced power consumption and reduced processing).

Figure 10:
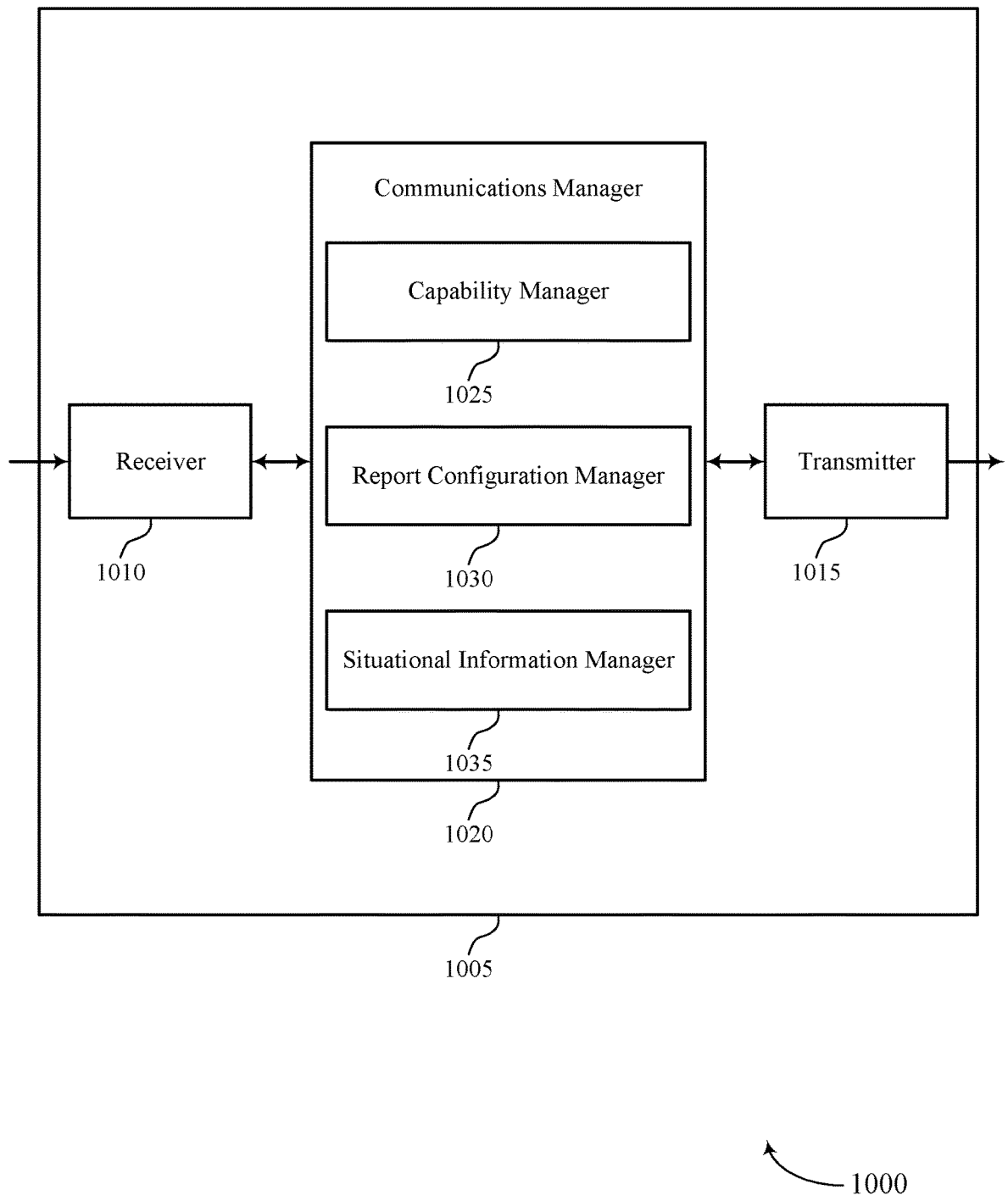

FIG. 10 shows a block diagram 1000 of a device 1005 that supports perception-aided beam-based communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of perception-aided beam-based communications as described herein. For example, the communications manager 1020 may include a capability manager 1025, a report configuration manager 1030, a situational information manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The capability manager 1025 may be configured as or otherwise support a means for receiving, from a first UE, a capability indication indicating that the first UE is capable of collecting data at one or more sensors and generating situational information. The report configuration manager 1030 may be configured as or otherwise support a means for transmitting, to the first UE based on receiving the capability indication, an indication of a configuration for a beam management report indicating that the first UE is to transmit the situational information to the network entity in the beam management report. The situational information manager 1035 may be configured as or otherwise support a means for receiving, from the first UE, the beam management report including the situational information, where the situational information is based on the collected data at the first UE.

Figure 11:
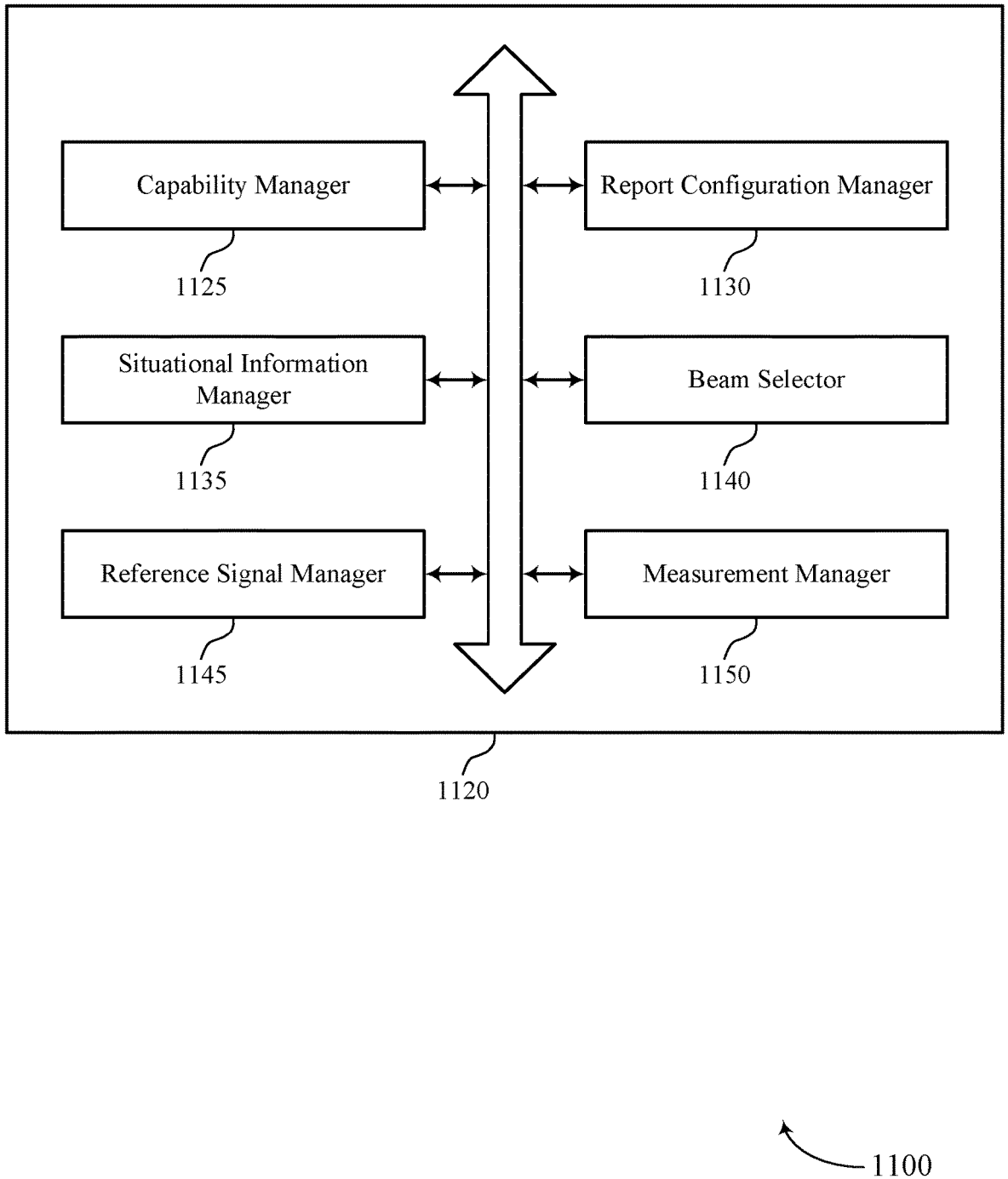
FIG. 11 shows a block diagram of a communications manager that supports perception-aided beam-based communications in accordance with one or more aspects of the present disclosure.

FIG. 11 shows a block diagram 1100 of a communications manager 1120 that supports perception-aided beam-based communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of perception-aided beam-based communications as described herein. For example, the communications manager 1120 may include a capability manager 1125, a report configuration manager 1130, a situational information manager 1135, a beam selector 1140, a reference signal manager 1145, a measurement manager 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The capability manager 1125 may be configured as or otherwise support a means for receiving, from a first UE, a capability indication indicating that the first UE is capable of collecting data at one or more sensors and generating situational information. The report configuration manager 1130 may be configured as or otherwise support a means for transmitting, to the first UE based on receiving the capability indication, an indication of a configuration for a beam management report indicating that the first UE is to transmit the situational information to the network entity in the beam management report. The situational information manager 1135 may be configured as or otherwise support a means for receiving, from the first UE, the beam management report including the situational information, where the situational information is based on the collected data at the first UE.

In some examples, the beam selector 1140 may be configured as or otherwise support a means for selecting one or more first beams for transmitting one or more first reference signals to the first UE based on the situational information, the one or more first reference signals being for beam management. In some examples, the report configuration manager 1130 may be configured as or otherwise support a means for transmitting a request for the first UE to monitor and report measurements performed on the one or more first reference signals. In some examples, the beam selector 1140 may be configured as or otherwise support a means for transmitting an indication of the one or more first beams to the first UE. In some examples, the reference signal manager 1145 may be configured as or otherwise support a means for transmitting the one or more first reference signals to the first UE using the one or more first beams.

In some examples, the measurement manager 1150 may be configured as or otherwise support a means for receiving, from the first UE, one or more measurements performed by the first UE on the one or more first reference signals. In some examples, the beam selector 1140 may be configured as or otherwise support a means for selecting a beam for communicating with the first UE based on the one or more measurements received from the first UE.

In some examples, the one or more measurements include reference signal received power measurements.

In some examples, the beam selector 1140 may be configured as or otherwise support a means for selecting one or more second beams for transmitting one or more second reference signals to a second UE based on the situational information received from the first UE, the second UE associated with the first UE. In some examples, the report configuration manager 1130 may be configured as or otherwise support a means for transmitting a request for the second UE to monitor and report measurements performed on the one or more second reference signals. In some examples, the beam selector 1140 may be configured as or otherwise support a means for transmitting an indication of the one or more second beams to the second UE. In some examples, the reference signal manager 1145 may be configured as or otherwise support a means for transmitting the one or more second reference signals to the second UE using the one or more second beams.

In some examples, the one or more first reference signals include channel state information reference signals.

In some examples, the situational information manager 1135 may be configured as or otherwise support a means for identifying a signal reflector based on the situational information received from the first UE in the beam management report, where the situational information indicates a location of the signal reflector.

In some examples, the beam selector 1140 may be configured as or otherwise support a means for selecting one or more first beams for transmitting one or more first reference signals to the first UE based on identifying the signal reflector, the one or more first reference signals being for beam management. In some examples, the report configuration manager 1130 may be configured as or otherwise support a means for transmitting a request for the first UE to monitor and report measurements performed on the one or more first reference signals. In some examples, the beam selector 1140 may be configured as or otherwise support a means for transmitting an indication of the one or more first beams to the first UE. In some examples, the reference signal manager 1145 may be configured as or otherwise support a means for transmitting the one or more reference signals to the first UE using the one or more first beams, the one or more reference signals reflected by the signal reflector to the first UE. In some examples, the measurement manager 1150 may be configured as or otherwise support a means for receiving, from the UE in a subsequent beam management report, one or more measurements performed by the UE on the one or more reference signals.

In some examples, the situational information includes a location of the first UE, dimensions of an object detected by the first UE, a Doppler spread at the first UE, confidence bounds associated with the data collected at the one or more sensors at the first UE, or a combination thereof.

Figure 12:
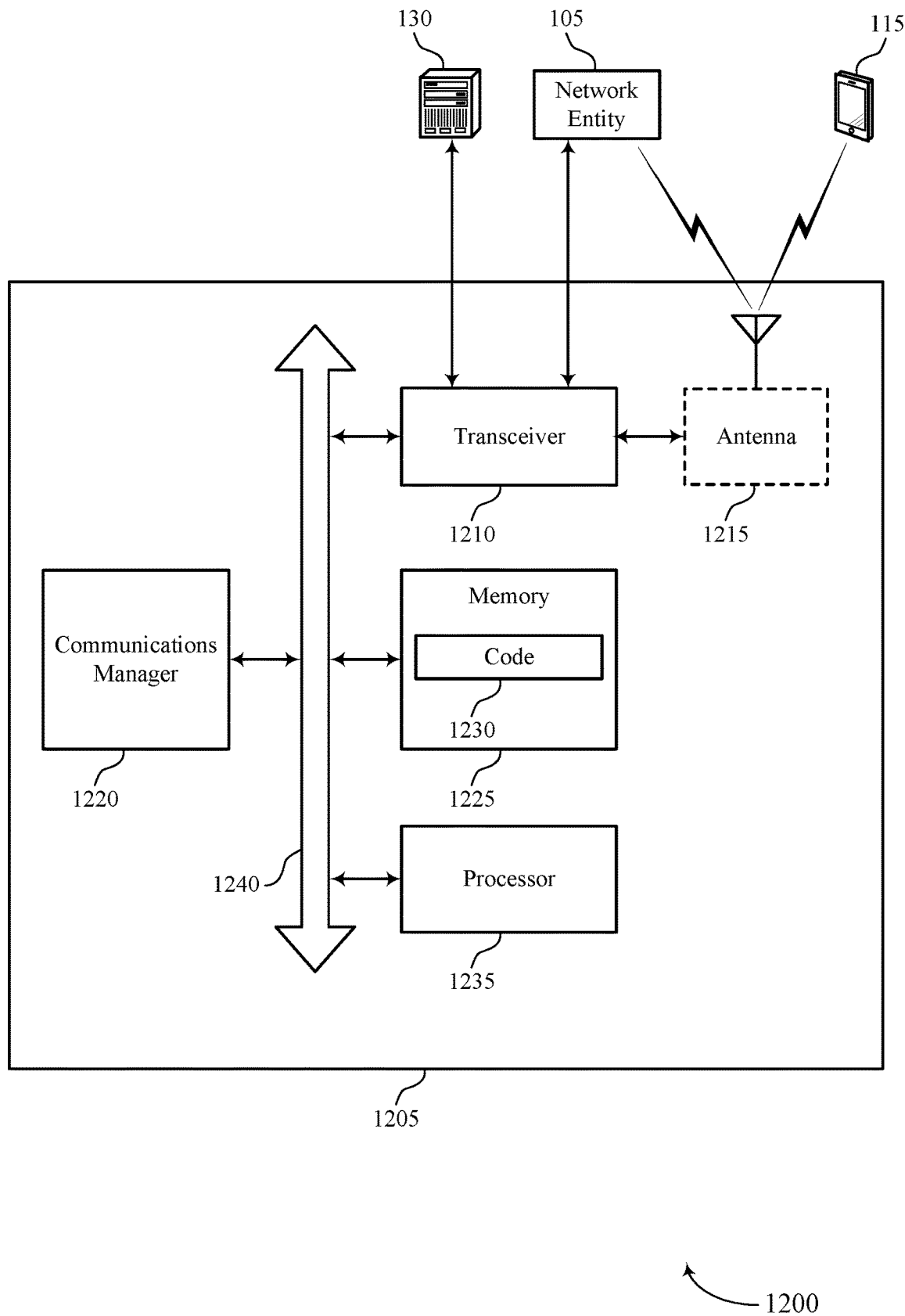
FIG. 12 shows a diagram of a system including a device that supports perception-aided beam-based communications in accordance with one or more aspects of the present disclosure.

FIG. 12 shows a diagram of a system 1200 including a device 1205 that supports perception-aided beam-based communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting perception-aided beam-based communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1205 may transmit information output from the chip or modem. In some implementations, the second interface may refer to an interface between the processing system of the chip or modem and a receiver, such that the device 1205 may obtain information or signal inputs, and the information may be passed to the processing system. A person having ordinary skill in the art will readily recognize that the first interface also may obtain information or signal inputs, and the second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for receiving, from a first UE, a capability indication indicating that the first UE is capable of collecting data at one or more sensors and generating situational information. The communications manager 1220 may be configured as or otherwise support a means for transmitting, to the first UE based on receiving the capability indication, an indication of a configuration for a beam management report indicating that the first UE is to transmit the situational information to the network entity in the beam management report. The communications manager 1220 may be configured as or otherwise support a means for receiving, from the first UE, the beam management report including the situational information, where the situational information is based on the collected data at the first UE.

By including or configuring the communications manager 1220 in accordance with examples as described herein, the device 1205 may support techniques for reduced processing, reduced power consumption, and more efficient utilization of communication resources. Because the device 1205 may receive, from a UE 115, situational information generated based on sensing data at the UE 115, the device 1205 may use the situational information for beam management, and beam management at the device 1205 may be improved. As a result, the device 1205 may identify suitable beams for communicating with a UE 115 (e.g., resulting in the more efficient utilization of communication resources) and the overhead for beam management may be reduced (e.g., resulting in the reduced power consumption and reduced processing).

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of perception-aided beam-based communications as described herein, or the processor 1235 and the memory 1225 may be otherwise configured to perform or support such operations.

Figure 13:
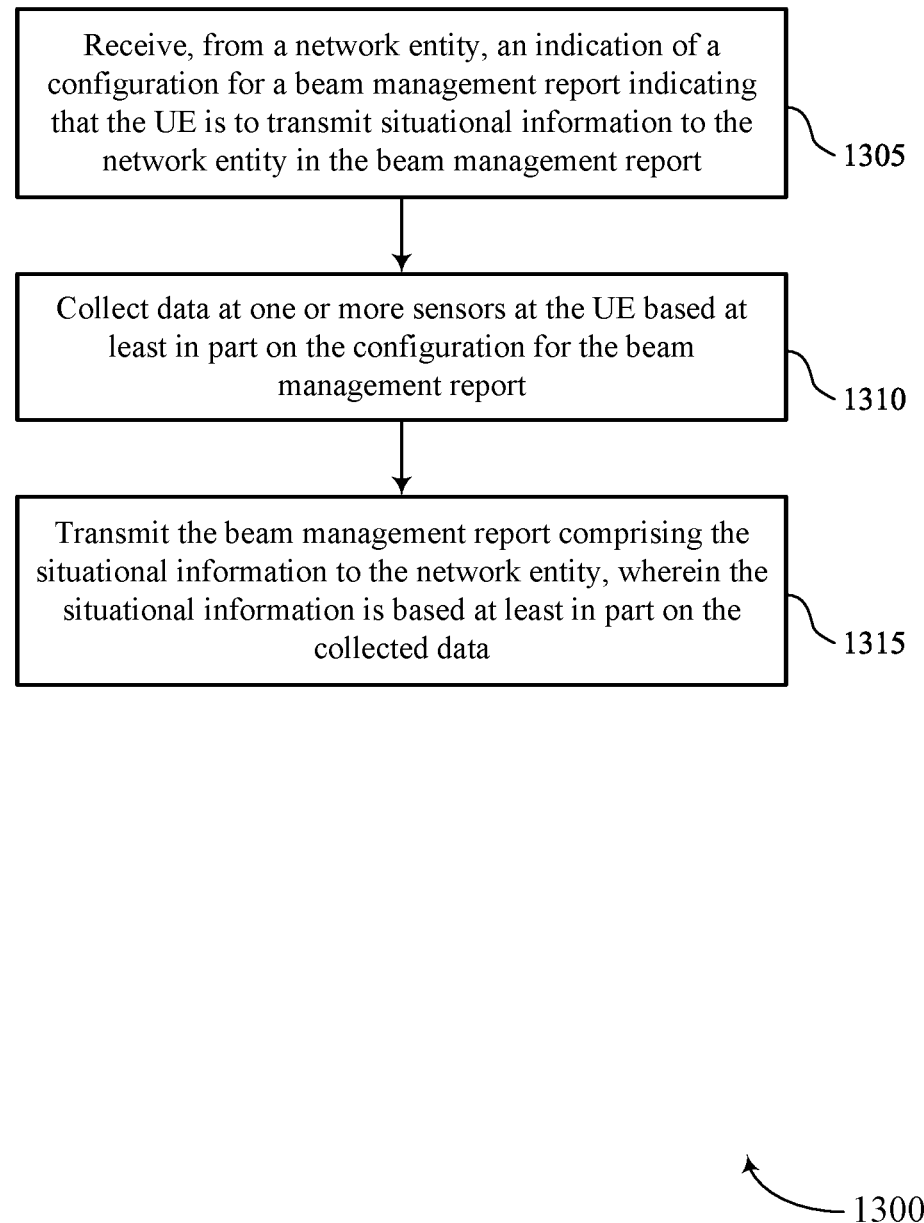
FIGS. 13 and 14 show flowcharts illustrating methods that support perception-aided beam-based communications in accordance with one or more aspects of the present disclosure.

FIG. 13 shows a flowchart illustrating a method 1300 that supports perception-aided beam-based communications in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, an indication of a configuration for a beam management report indicating that the UE is to transmit situational information to the network entity in the beam management report. The operations of 1305 may be performed in accordance with examples as disclosed herein. In some examples, aspects of the operations of 1305 may be performed by a report configuration manager 725 as described with reference to FIG. 7.

At 1310, the method may include collecting data at one or more sensors at the UE based on the configuration for the beam management report. The operations of 1310 may be performed in accordance with examples as disclosed herein. In some examples, aspects of the operations of 1310 may be performed by a data collector 730 as described with reference to FIG. 7.

At 1315, the method may include transmitting the beam management report including the situational information to the network entity, where the situational information is based on the collected data. The operations of 1315 may be performed in accordance with examples as disclosed herein. In some examples, aspects of the operations of 1315 may be performed by a situational information manager 735 as described with reference to FIG. 7.

Figure 14:
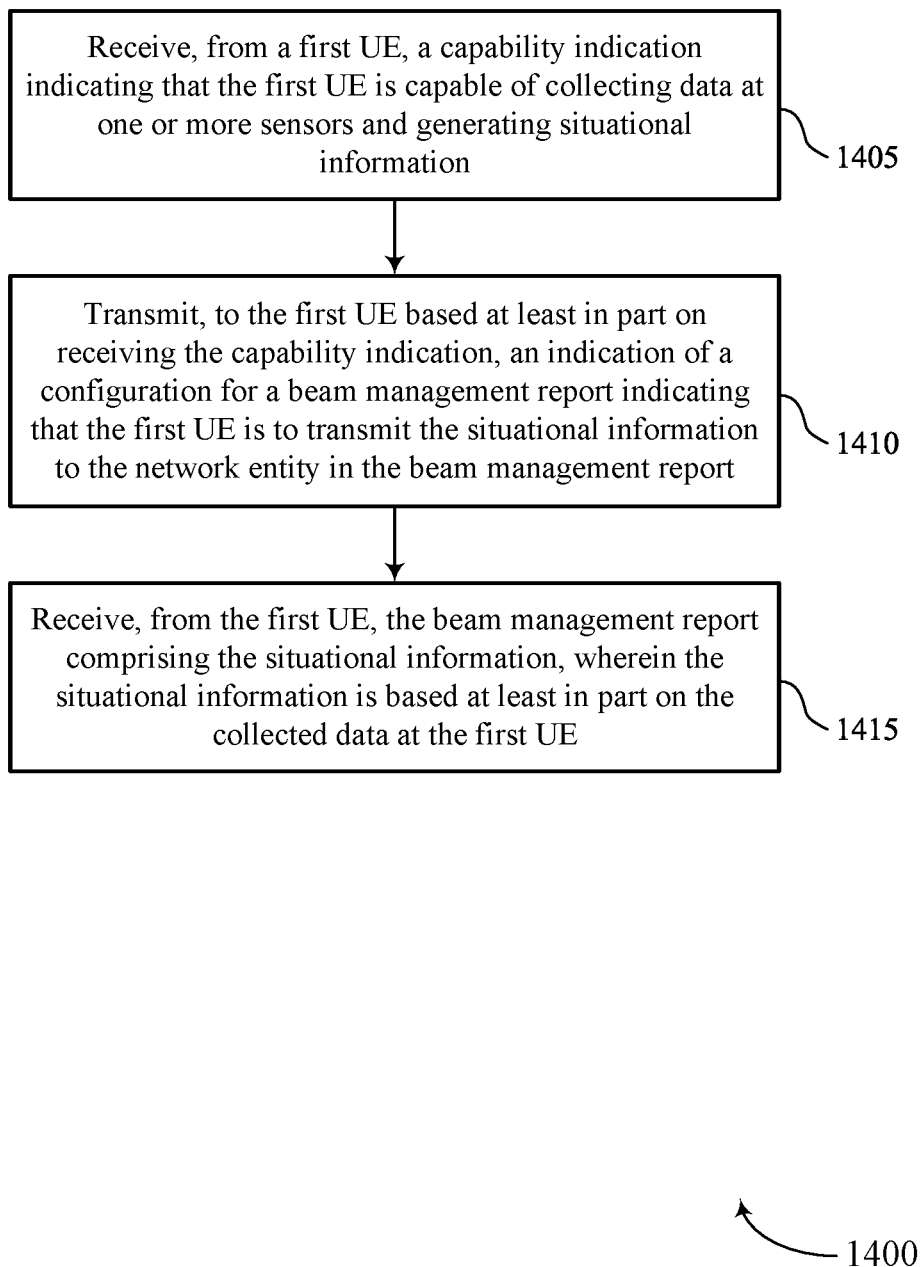

FIG. 14 shows a flowchart illustrating a method 1400 that supports perception-aided beam-based communications in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include receiving, from a first UE, a capability indication indicating that the first UE is capable of collecting data at one or more sensors and generating situational information. The operations of 1405 may be performed in accordance with examples as disclosed herein. In some examples, aspects of the operations of 1405 may be performed by a capability manager 1125 as described with reference to FIG. 11.

At 1410, the method may include transmitting, to the first UE based on receiving the capability indication, an indication of a configuration for a beam management report indicating that the first UE is to transmit the situational information to the network entity in the beam management report. The operations of 1410 may be performed in accordance with examples as disclosed herein. In some examples, aspects of the operations of 1410 may be performed by a report configuration manager 1130 as described with reference to FIG. 11.

At 1415, the method may include receiving, from the first UE, the beam management report including the situational information, where the situational information is based on the collected data at the first UE. The operations of 1415 may be performed in accordance with examples as disclosed herein. In some examples, aspects of the operations of 1415 may be performed by a situational information manager 1135 as described with reference to FIG. 11.

The following provides an overview of aspects of the present disclosure:

Aspect 1: A method for wireless communication at a user equipment, comprising: receiving, from a network entity, an indication of a configuration for a beam management report indicating that the UE is to transmit situational information to the network entity in the beam management report; collecting data at one or more sensors at the UE based at least in part on the configuration for the beam management report; and transmitting the beam management report comprising the situational information to the network entity, wherein the situational information is based at least in part on the collected data.

Aspect 2: The method of aspect 1, further comprising: transmitting, to the network entity, a capability indication indicating that the UE is capable of collecting the data at the one or more sensors and generating the situational information, wherein receiving the indication of the configuration for the beam management report is based at least in part on transmitting the capability indication.

Aspect 3: The method of any of aspects 1 through 2, further comprising: selecting one or more beams for receiving one or more reference signals from the network entity based at least in part on the situational information, the one or more reference signals being for beam management; and receiving the one or more reference signals from the network entity using the one or more beams.

Aspect 4: The method of aspect 3, wherein the one or more reference signals comprise synchronization signal blocks or channel state information reference signals.

Aspect 5: The method of any of aspects 1 through 4, further comprising: performing one or more measurements on a first subset of one or more reference signals received from the network entity based at least in part on the situational information; and skipping performing one or more measurements on a second subset of the one or more reference signals received from the network entity based at least in part on the situational information.

Aspect 6: The method of aspect 5, further comprising: transmitting the one or more measurements performed on the first subset of the one or more reference signals in the beam management report to the network entity.

Aspect 7: The method of any of aspects 5 through 6, wherein the one or more measurements comprise reference signal received power measurements.

Aspect 8: The method of any of aspects 1 through 7, further comprising: identifying a signal reflector based at least in part on one or more of the data collected at the one or more sensors at the UE, measurements performed on one or more reference signals received from the network entity, or a beam codebook at the UE, wherein the situational information indicates a location of the signal reflector.

Aspect 9: The method of aspect 8, further comprising: receiving, from the network entity, one or more reference signals reflected by the signal reflector to the UE based at least in part on transmitting the situational information indicating the location of the signal reflector to the network entity; performing one or more measurements on the one or more reference signals; and transmitting the one or more measurements to the network entity in a subsequent beam management report.

Aspect 10: The method of any of aspects 1 through 9, wherein the situational information comprises a location of the UE, dimensions of an object detected by the UE, a Doppler spread at the UE, confidence bounds associated with the data collected at the one or more sensors at the UE, or a combination thereof.

Aspect 11: A method for wireless communication at a network entity, comprising: receiving, from a first UE, a capability indication indicating that the first UE is capable of collecting data at one or more sensors and generating situational information; transmitting, to the first UE based at least in part on receiving the capability indication, an indication of a configuration for a beam management report indicating that the first UE is to transmit the situational information to the network entity in the beam management report; and receiving, from the first UE, the beam management report comprising the situational information, wherein the situational information is based at least in part on the collected data at the first UE.

Aspect 12: The method of aspect 11, further comprising: selecting one or more first beams for transmitting one or more first reference signals to the first UE based at least in part on the situational information, the one or more first reference signals being for beam management; transmitting a request for the first UE to monitor and report measurements performed on the one or more first reference signals; transmitting an indication of the one or more first beams to the first UE; and transmitting the one or more first reference signals to the first UE using the one or more first beams.

Aspect 13: The method of aspect 12, further comprising: receiving, from the first UE, one or more measurements performed by the first UE on the one or more first reference signals; and selecting a beam for communicating with the first UE based at least in part on the one or more measurements received from the first UE.

Aspect 14: The method of aspect 13, wherein the one or more measurements comprise reference signal received power measurements.

Aspect 15: The method of any of aspects 12 through 14, further comprising: selecting one or more second beams for transmitting one or more second reference signals to a second UE based at least in part on the situational information received from the first UE, the second UE associated with the first UE; transmitting a request for the second UE to monitor and report measurements performed on the one or more second reference signals; transmitting an indication of the one or more second beams to the second UE; and transmitting the one or more second reference signals to the second UE using the one or more second beams.

Aspect 16: The method of any of aspects 12 through 15, wherein the one or more first reference signals comprise channel state information reference signals.

Aspect 17: The method of any of aspects 11 through 16, further comprising: identifying a signal reflector based at least in part on the situational information received from the first UE in the beam management report, wherein the situational information indicates a location of the signal reflector.

Aspect 18: The method of aspect 17, further comprising: selecting one or more first beams for transmitting one or more first reference signals to the first UE based at least in part on identifying the signal reflector, the one or more first reference signals being for beam management; transmitting a request for the first UE to monitor and report measurements performed on the one or more first reference signals; transmitting an indication of the one or more first beams to the first UE; transmitting the one or more reference signals to the first UE using the one or more first beams, the one or more reference signals reflected by the signal reflector to the first UE; and receiving, from the UE in a subsequent beam management report, one or more measurements performed by the UE on the one or more reference signals.

Aspect 19: The method of any of aspects 11 through 18, wherein the situational information comprises a location of the first UE, dimensions of an object detected by the first UE, a Doppler spread at the first UE, confidence bounds associated with the data collected at the one or more sensors at the first UE, or a combination thereof.

Aspect 20: An apparatus for wireless communication at a user equipment, comprising a processor; memory coupled with the processor; and instructions stored in the memory and executable by the processor to cause the apparatus to perform a method of any of aspects 1 through 10.

Aspect 21: An apparatus for wireless communication at a user equipment, comprising at least one means for performing a method of any of aspects 1 through 10.

Aspect 22: A non-transitory computer-readable medium storing code for wireless communication at a user equipment, the code comprising instructions executable by a processor to perform a method of any of aspects 1 through 10.

Aspect 23: An apparatus for wireless communication at a network entity, comprising a processor; memory coupled with the processor; and instructions stored in the memory and executable by the processor to cause the apparatus to perform a method of any of aspects 11 through 19.

Aspect 24: An apparatus for wireless communication at a network entity, comprising at least one means for performing a method of any of aspects 11 through 19.

Aspect 25: A non-transitory computer-readable medium storing code for wireless communication at a network entity, the code comprising instructions executable by a processor to perform a method of any of aspects 11 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
one or more processors;
one or more memories coupled with the one or more processors; and
instructions stored in the one or more memories and executable by the one or more processors to cause the apparatus to:
transmit, to a network entity, a capability indication indicating that the UE is capable of collecting data at one or more sensors and generating situational information;
receive, from the network entity based at least in part on transmitting the capability indication, an indication of a configuration for a beam management report indicating that the UE is to transmit the situational information to the network entity in the beam management report;

collect data at the one or more sensors at the UE based at least in part on the configuration for the beam management report; and transmit the beam management report comprising the situational information to the network entity, wherein the situational information is based at least in part on the collected data.

2. The apparatus of claim 1, wherein the instructions are further executable by the one or more processors to cause the apparatus to:

select one or more beams for receiving one or more reference signals from the network entity based at least in part on the situational information, the one or more reference signals being for beam management; and receive the one or more reference signals from the network entity using the one or more beams.

3. The apparatus of claim 2, wherein:

the one or more reference signals comprise synchronization signal blocks or channel state information reference signals.

4. The apparatus of claim 1, wherein the instructions are further executable by the one or more processors to cause the apparatus to:

perform one or more first measurements on a first subset of one or more reference signals received from the network entity based at least in part on the situational information; and skip performing one or more second measurements on a second subset of the one or more reference signals received from the network entity based at least in part on the situational information.

5. The apparatus of claim 4, wherein the instructions are further executable by the one or more processors to cause the apparatus to:

transmit the one or more first measurements performed on the first subset of the one or more reference signals in the beam management report to the network entity.

6. The apparatus of claim 4, wherein:

the one or more first measurements comprise reference signal received power measurements.

7. The apparatus of claim 1, wherein the instructions are further executable by the one or more processors to cause the apparatus to:

identify a signal reflector based at least in part on one or more of the data collected at the one or more sensors at the UE, measurements performed on one or more reference signals received from the network entity, or a beam codebook at the UE, wherein the situational information indicates a location of the signal reflector.

8. The apparatus of claim 7, wherein the instructions are further executable by the one or more processors to cause the apparatus to:

receive, from the network entity, one or more reference signals reflected by the signal reflector to the UE based at least in part on transmitting the situational information indicating the location of the signal reflector to the network entity;

perform one or more measurements on the one or more reference signals; and transmit the one or more measurements to the network entity in a subsequent beam management report.

9. The apparatus of claim 1, wherein the situational information comprises a location of the UE, dimensions of an object detected by the UE, a Doppler spread at the UE, confidence bounds associated with the data collected at the one or more sensors at the UE, or a combination thereof.

10. An apparatus for wireless communication at a network entity, comprising:

one or more processors;

one or more memories coupled with the one or more processors; and instructions stored in the one or more memories and executable by the one or more processors to cause the apparatus to:

receive, from a first user equipment (UE), a capability indication indicating that the first UE is capable of collecting data at one or more sensors and generating situational information;

transmit, to the first UE based at least in part on receiving the capability indication, an indication of a configuration for a beam management report indicating that the first UE is to transmit the situational information to the network entity in the beam management report; and receive, from the first UE, the beam management report comprising the situational information, wherein the situational information is based at least in part on the collected data at the first UE.

11. The apparatus of claim 10, wherein the instructions are further executable by the one or more processors to cause the apparatus to:

select one or more first beams for transmitting one or more first reference signals to the first UE based at least in part on the situational information, the one or more first reference signals being for beam management;

transmit a request for the first UE to monitor and report measurements performed on the one or more first reference signals;

transmit an indication of the one or more first beams to the first UE; and transmit the one or more first reference signals to the first UE using the one or more first beams.

12. The apparatus of claim 11, wherein the instructions are further executable by the one or more processors to cause the apparatus to:

receive, from the first UE, one or more measurements performed by the first UE on the one or more first reference signals; and select a beam for communicating with the first UE based at least in part on the one or more measurements received from the first UE.

13. The apparatus of claim 12, wherein:

the one or more measurements comprise reference signal received power measurements.

14. The apparatus of claim 11, wherein the instructions are further executable by the one or more processors to cause the apparatus to:

select one or more second beams for transmitting one or more second reference signals to a second UE based at least in part on the situational information received from the first UE, the second UE associated with the first UE;

transmit a request for the second UE to monitor and report measurements performed on the one or more second reference signals;

transmit an indication of the one or more second beams to the second UE; and transmit the one or more second reference signals to the second UE using the one or more second beams.

15. The apparatus of claim 11, wherein:

the one or more first reference signals comprise channel state information reference signals.

16. The apparatus of claim 10, wherein the instructions are further executable by the one or more processors to cause the apparatus to:
identify a signal reflector based at least in part on the situational information received from the first UE in the beam management report, wherein the situational information indicates a location of the signal reflector.

17. The apparatus of claim 16, wherein the instructions are further executable by the one or more processors to cause the apparatus to:
select one or more first beams for transmitting one or more first reference signals to the first UE based at least in part on identifying the signal reflector, the one or more first reference signals being for beam management;
transmit a request for the first UE to monitor and report measurements performed on the one or more first reference signals;
transmit an indication of the one or more first beams to the first UE;
transmit the one or more first reference signals to the first UE using the one or more first beams, the one or more first reference signals reflected by the signal reflector to the first UE; and
receive, from the first UE in a subsequent beam management report, one or more measurements performed by the first UE on the one or more first reference signals.

18. The apparatus of claim 10, wherein the situational information comprises a location of the first UE, dimensions of an object detected by the first UE, a Doppler spread at the first UE, confidence bounds associated with the data collected at the one or more sensors at the first UE, or a combination thereof.

19. A method for wireless communication at a user equipment (UE), comprising:
transmitting, to a network entity, a capability indication indicating that the UE is capable of collecting data at one or more sensors and generating situational information;
receiving, from the network entity and based at least in part on transmitting the capability indication, an indication of a configuration for a beam management report indicating that the UE is to transmit the situational information to the network entity in the beam management report;
collecting data at the one or more sensors at the UE based at least in part on the configuration for the beam management report; and
transmitting the beam management report comprising the situational information to the network entity, wherein the situational information is based at least in part on the collected data.

20. The method of claim 19, further comprising:
selecting one or more beams for receiving one or more reference signals from the network entity based at least in part on the situational information, the one or more reference signals being for beam management; and
receiving the one or more reference signals from the network entity using the one or more beams.

21. The method of claim 20, wherein the one or more reference signals comprise synchronization signal blocks or channel state information reference signals.

22. The method of claim 19, further comprising:
performing one or more first measurements on a first subset of one or more reference signals received from the network entity based at least in part on the situational information; and
skipping performing one or more second measurements on a second subset of the one or more reference signals received from the network entity based at least in part on the situational information.

23. The method of claim 22, further comprising:
transmitting the one or more first measurements performed on the first subset of the one or more reference signals in the beam management report to the network entity.

24. The method of claim 22, wherein the one or more first measurements comprise reference signal received power measurements.

25. The method of claim 19, further comprising:
identifying a signal reflector based at least in part on one or more of the data collected at the one or more sensors at the UE, measurements performed on one or more reference signals received from the network entity, or a beam codebook at the UE, wherein the situational information indicates a location of the signal reflector.

26. The method of claim 25, further comprising:
receiving, from the network entity, one or more reference signals reflected by the signal reflector to the UE based at least in part on transmitting the situational information indicating the location of the signal reflector to the network entity;
performing one or more measurements on the one or more reference signals; and
transmitting the one or more measurements to the network entity in a subsequent beam management report.

27. The method of claim 19, wherein the situational information comprises a location of the UE, dimensions of an object detected by the UE, a Doppler spread at the UE, confidence bounds associated with the data collected at the one or more sensors at the UE, or a combination thereof.

28. A method for wireless communication at a network entity, comprising:
receiving, from a first user equipment (UE), a capability indication indicating that the first UE is capable of collecting data at one or more sensors and generating situational information;
transmitting, to the first UE based at least in part on receiving the capability indication, an indication of a configuration for a beam management report indicating that the first UE is to transmit the situational information to the network entity in the beam management report; and
receiving, from the first UE, the beam management report comprising the situational information, wherein the situational information is based at least in part on the collected data at the first UE.

* * * * *